United States Patent
Matsuda et al.

(10) Patent No.: US 10,127,310 B2
(45) Date of Patent: Nov. 13, 2018

(54) SEARCH METHOD AND SYSTEM

(71) Applicant: FUJITSU LIMITED, Kawasaki-shi, Kanagawa (JP)

(72) Inventors: Yuji Matsuda, Kawasaki (JP); Kentaro Tsuji, Kawasaki (JP); Mingxie Zheng, Kawasaki (JP); Nobuhiro Miyazaki, Kawasaki (JP); Akihiro Minagawa, Tachikawa (JP); Yusuke Uehara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 86 days.

(21) Appl. No.: 15/049,809

(22) Filed: Feb. 22, 2016

(65) Prior Publication Data
US 2016/0283590 A1  Sep. 29, 2016

(30) Foreign Application Priority Data

Mar. 24, 2015  (JP) ................... 2015-061454

(51) Int. Cl.
*G06K 9/00* (2006.01)
*G06F 17/30* (2006.01)
(Continued)

(52) U.S. Cl.
CPC ... *G06F 17/30793* (2013.01); *G06K 9/00369* (2013.01); *G06K 9/3233* (2013.01); *G06K 2009/363* (2013.01)

(58) Field of Classification Search
None
See application file for complete search history.

(56) References Cited

U.S. PATENT DOCUMENTS 9,208,377 B2 * 12/2015 Mizuno ............. G06K 9/00369
9,349,042 B2 *  5/2016 Takenaka .......... G06K 9/00369
(Continued)

FOREIGN PATENT DOCUMENTS

JP  2005-202938  7/2005
JP  2009-199322  9/2009
(Continued)

OTHER PUBLICATIONS

Mittal et al., "M2Tracker: A Milti-View Approach to Segmenting and Tracking People in a Cluttered Scene", International Journal of Computer Vision 51(3), 2003, pp. 189-203.*
(Continued)

*Primary Examiner* — Matthew Bella
*Assistant Examiner* — Jose M Torres
(74) *Attorney, Agent, or Firm* — Oblon, McClelland, Maier & Neustadt, L.L.P.

(57) ABSTRACT

A search system includes circuitry configured to detect an first object to be a search target, from information of an image that is captured by an imaging device, determine a parameter in consideration of how the first object is viewed in the image, in accordance with a height at which the imaging device is installed, a depression angle of the imaging device, and a distance from the imaging device to the first object, divide an image region corresponding to the first object into at least two image regions based on a dividing ratio that is obtained by correcting a predetermined ratio in accordance with the parameter, and specify a second object in another image based on feature information of each of the at least two image regions, the second object corresponding to the first object in the image.

17 Claims, 24 Drawing Sheets

(51) Int. Cl.
 *G06K 9/32* (2006.01)
 *G06K 9/36* (2006.01)

(56) References Cited

U.S. PATENT DOCUMENTS

| | | | | |
|---|---|---|---|---|
| 9,412,180 B2* | 8/2016 | Ono | ............ | H04N 7/18 |
| 2003/0048926 A1* | 3/2003 | Watanabe | ............ | G06K 9/00362 |
| | | | | 382/103 |
| 2006/0159370 A1 | 7/2006 | Tanaka et al. | | |
| 2007/0003141 A1* | 1/2007 | Rittscher | ............ | G06K 9/00778 |
| | | | | 382/181 |
| 2009/0066490 A1* | 3/2009 | Mitzutani | ............ | G06K 9/00362 |
| | | | | 340/435 |
| 2009/0128652 A1* | 5/2009 | Fujii | ............ | G06T 7/254 |
| | | | | 348/222.1 |
| 2010/0195899 A1* | 8/2010 | Nc | ............ | G06K 9/00369 |
| | | | | 382/154 |
| 2012/0201468 A1 | 8/2012 | Oami et al. | | |
| 2013/0051662 A1* | 2/2013 | Shiozaki | ............ | G06K 9/00228 |
| | | | | 382/159 |
| 2013/0155229 A1* | 6/2013 | Thornton | ............ | H04N 7/18 |
| | | | | 348/143 |
| 2013/0201330 A1* | 8/2013 | Thornton | ............ | H04N 7/18 |
| | | | | 348/143 |
| 2014/0211994 A1* | 7/2014 | Takenaka | ............ | G06K 9/00369 |
| | | | | 382/103 |
| 2014/0328512 A1* | 11/2014 | Gurwicz | ............ | G06K 9/00771 |
| | | | | 382/103 |
| 2016/0110602 A1* | 4/2016 | Chujo | ............ | F24F 11/30 |
| | | | | 382/103 |

FOREIGN PATENT DOCUMENTS

| | | |
|---|---|---|
| JP | 2014-93023 | 5/2014 |
| WO | WO 2011/046128 A1 | 4/2011 |
| WO | WO 2012/161291 A1 | 11/2012 |

OTHER PUBLICATIONS

Krumm et al., "Multi-Camera Multi-Person Tracking for EasyLiving", Third IEEE International Workshop on Visual Surveillance, 2000.*

Navneet Dalal et al. "Histograms of Oriented Gradients for Human Detection", 2005 IEEE Computer Society Conference on Computer Vision and Pattern Recognition (CVPR), vol. 1, Jun. 25, 2005, 8 pages.

Yuji Yamauchi et al. "Human Detection Based on Statistical Learning from Image", Journal of the Institute of Electronics, Information and Communication Engineers, IEICE, vol. J96-D, No. 9, Sep. 9, 2013, 25 pages (with English Abstract).

* cited by examiner

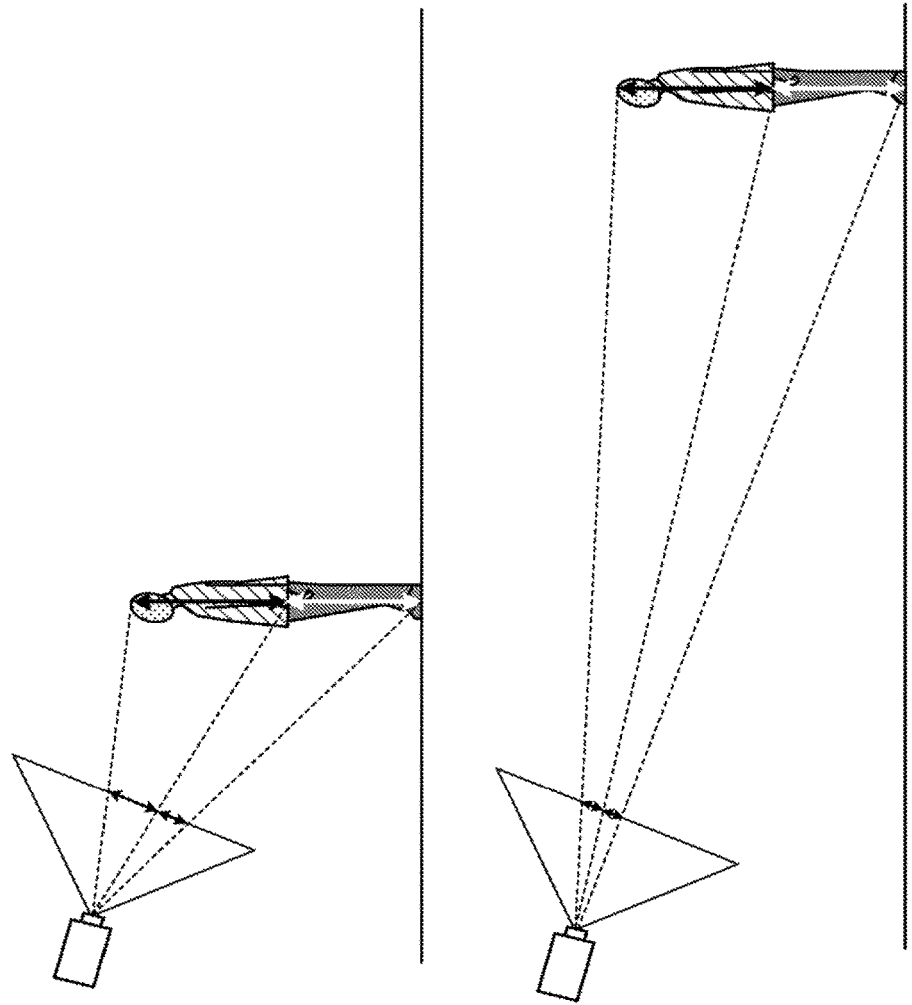

FIG. 9

| IMAGE IDENTIFICATION INFORMATION | IMAGE INFORMATION |
|---|---|
| 001 | Img001 |
| 002 | Img002 |
| ... | ... |

| SEGMENT IDENTIFICATION INFORMATION | COORDINATES 1 | COORDINATES 2 | DIVIDING RATIO |
|---|---|---|---|
| 1_1 | (0,0) | (xs1,ys1) | 0.50 |
| ... | ... | ... | ... |
| 3_3 | (xs2,ys2) | (xs3,ys3) | 0.34 |
| ... | ... | ... | ... |

FIG. 13

| IMAGE IDENTIFICATION INFORMATION | PERSON REGION IDENTIFICATION INFORMATION | IMAGE REGION IDENTIFICATION INFORMATION | COORDINATES 1 | COORDINATES 2 | COLOR HISTOGRAM |
|---|---|---|---|---|---|
| 001 | 1 | 1 | (x1,y1) | (x2,yd1) | AAA |
| 001 | 1 | 2 | (x1,yd1) | (x2,y2) | BBB |
| ... | ... | ... | ... | ... | ... |
| 300 | 1 | 1 | (x3,y3) | (x4,yd2) | CCC |
| 300 | 1 | 2 | (x3,yd2) | (x4,y4) | DDD |

FIG. 17

| IMAGE IDENTIFICATION INFORMATION | PERSON REGION IDENTIFICATION INFORMATION | COORDINATES 1 | COORDINATES 2 | DIVIDING RATIO |
|---|---|---|---|---|
| 100 | 1 | (xa,ya) | (xb,yb) | 0.51 |
| 101 | 1 | (xc,yc) | (xd,yd) | 0.55 |

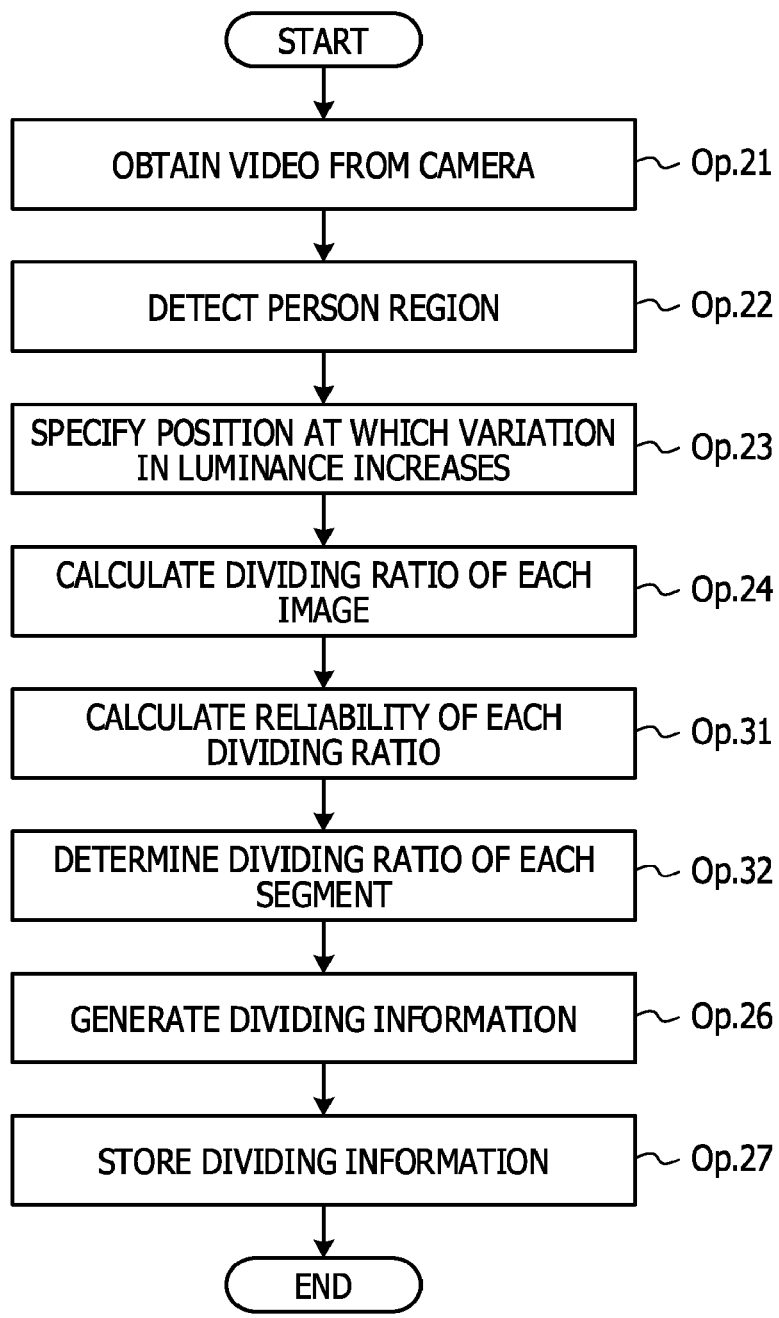

FIG. 20

| IMAGE IDENTIFICATION INFORMATION | PERSON REGION IDENTIFICATION INFORMATION | COORDINATES 1 | COORDINATES 2 | DIVIDING RATIO | RELIABILITY |
|---|---|---|---|---|---|
| 100 | 1 | (xa,ya) | (xb,yb) | 0.51 | R1 |
| 101 | 1 | (xc,yc) | (xd,yd) | 0.55 | R2 |
| ... | ... | ... | ... | ... | ... |

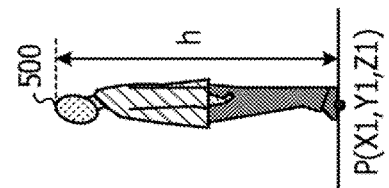
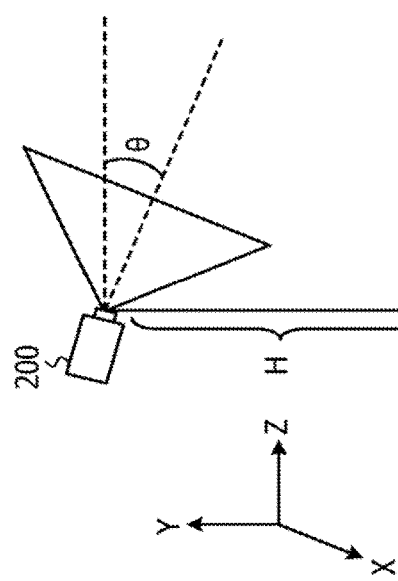
FIG. 23A
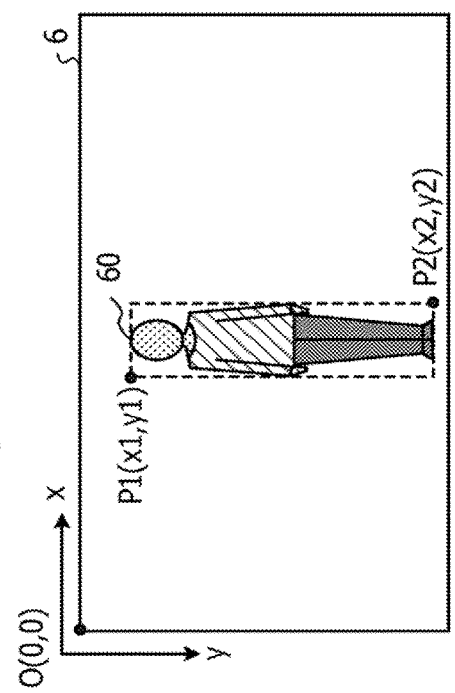
FIG. 23B

## SEARCH METHOD AND SYSTEM

CROSS-REFERENCE TO RELATED APPLICATION

This application is based upon and claims the benefit of priority of the prior Japanese Patent Application No. 2015-061454, filed on Mar. 24, 2015, the entire contents of which are incorporated herein by reference.

FIELD

The embodiments discussed herein are related to a technique of searching for video that is captured by a camera such as a monitoring camera.

BACKGROUND

In the related art, a system for searching for an image including a captured image of a specific person from video that is captured by a monitoring camera is known. Such a system is used for searching for stray children and missing persons or analyzing behavioral patterns of consumers by person tracking, for example.

For example, a system disclosed in Japanese Laid-open Patent Publication No. 2009-199322 may search for an image including a captured image of a specific person from accumulated video. The system extracts feature information of person's face and feature information of clothes (color histogram and the like) and stores such information in a database when the system records the video. Then, the system extracts an image including a captured image of a person who is similar to a person in a query image from the database.

Specifically, the system compares feature information of a face and feature information of clothes, which are stored in the database, with the feature information of the face and the feature information of the clothes, which are extracted from the query image, and searches for an image with similarity that is equal to or greater than a threshold from the database. The system disclosed in Japanese Laid-open Patent Publication No. 2009-199322 includes a face feature extraction unit that extracts a face region and extracts features from the extracted face region and a clothing feature extraction unit that extracts a clothing region and extract features from the extracted clothing region.

Here, color information (a color histogram or the like) is typically used as feature information. This is because quality of video captured by a monitoring camera is low, it is difficult to recognize detailed features, and determination based on colors is effective. Color features are more stable than other features and have an advantage that the color features are not easily affected by a facing direction of a person and outside light. Therefore, an image including a captured image of a person in similar clothes is searched for from video that is captured by the monitoring camera by comparing the color information.

In a case of comparing color information of the "entire" clothing region of the person in the query image with color information of a clothing region of a person in an image that is registered in the database, there is a possibility that a person in different clothes from those of the person in the query image is searched for from the database as a search result. Specifically, there is a possibility that an image including a captured image of a person in a black jacket and white pants is searched for from the database in response to a query image including a captured image of a person in a white jacket and black pants. This is because a certain range is permitted in determination of similarity and an image with similarity that is equal to or greater than a threshold is searched for even in cases other than a case in which two pieces of color information completely coincide with each other.

Thus, there is a technique of dividing the clothing region and extracting feature information from each of the divided regions in order to further narrow down the search results. A system disclosed in International Publication Pamphlet No. 2011/046128 extracts a person region from video and then separates a clothing region of the person into a plurality of portions. Specifically, the system determines discontinuity (separation position) in clothing based on a variation in luminance in a longitudinal direction of a clothing region and extracts color information from each of an upper region over the separation position and a lower region under the separation position. Then, the extracted color information of each of the regions is accumulated in a database. In the system, a query text, for example, "a white jacket and blue pants" is received as a query and an image including a captured image of a person in clothes corresponding to the query text is searched for.

SUMMARY

According to an aspect of the invention, a search system includes circuitry configured to detect an first object to be a search target, from information of an image that is captured by an imaging device, determine a parameter in consideration of how the first object is viewed in the image, in accordance with a height at which the imaging device is installed, a depression angle of the imaging device, and a distance from the imaging device to the first object, divide an image region corresponding to the first object into at least two image regions based on a dividing ratio that is obtained by correcting a predetermined ratio in accordance with the parameter, and specify a second object in another image based on feature information of each of the at least two image regions, the second object corresponding to the first object in the image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B are diagrams for describing a problem that is caused by a positional relationship between a camera and a person (part 1);

FIG. 9 is an example of a data configuration in a video storage unit;

FIG. 13 is an example of a data configuration in a feature information storage unit;

FIG. 17 is an example of a data configuration in a learning table storage unit (part 1);

FIG. 18 is a processing flow of the method of generating the dividing information according to Modification Example 1 (part 2);

FIG. 20 is an example of a data configuration in the learning table storage unit (part 2);

FIGS. 23A and 23B are diagrams for describing a method of determining a dividing position that reflects a dividing ratio according to the second embodiment.

DESCRIPTION OF EMBODIMENTS

In a case of combining the technique disclosed in Japanese Laid-open Patent Publication No. 2009-199322 and the technique disclosed in International Publication Pamphlet No. 2011/046128, it is expected to become possible to search for an image including a captured image of a person wearing similar clothes to those of a person in a query image by using a database prepared by dividing a clothing region into a plurality of regions in advance.

Specifically, if a search request including a query image is received, discontinuity in clothes in a clothing region of a person in the query image is specified. A database is searched by using feature information that is extracted from an upper region above the discontinuity and feature information that is extracted from a lower region under the discontinuity.

Figure 1A:
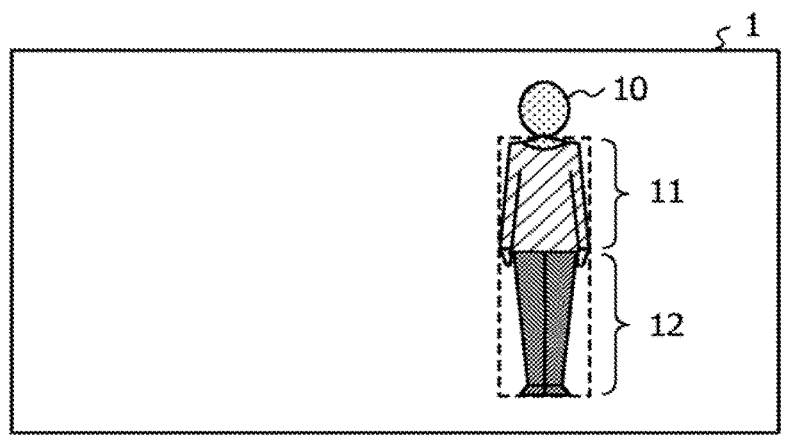
FIGS. 1A and 1B are diagrams for describing a problem in the related art (part 1)
Figure 1B:
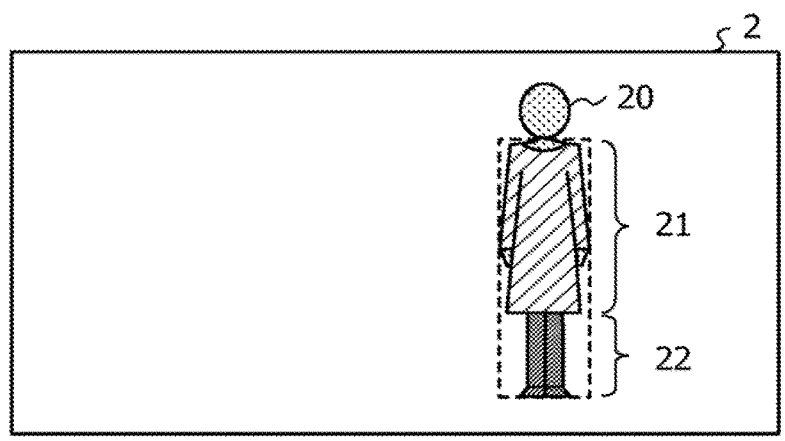
Figure 2:
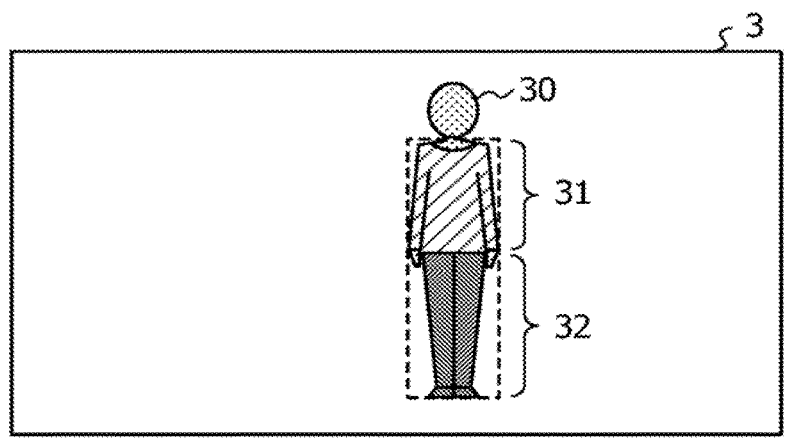
FIG. 2 is a diagram for describing a problem in the related art (part 2)

However, the following problems occur if only the discontinuity in the clothes is used as an index. FIGS. 1A, 1B, and 2 are diagrams for describing the problems in the related art. When the technique disclosed in International Publication Pamphlet No. 2011/046128 is used, a clothing region of a person 10 in an image 1 illustrated in FIG. 1A is divided into an upper region 11 and a lower region 12. Then, color information that is extracted from the upper region 11 and color information that is extracted from the lower region 12 are respectively registered in the database. It is assumed that the person 10 wears a white T-shirt and black pants. Here, the white portion is represented by a stripe pattern, and the black portion is represented by a dot pattern in FIGS. 1A and 1B.

As illustrated in FIG. 1B, a clothing region of a person 20 in an image 2 is divided into an upper region 21 and a lower region 22. Then, color information that is extracted from the upper region 21 and color information that is extracted from the lower region 22 are respectively registered in the database. It is assumed that the person 20 wears a white one-piece dress and black tights. Typically, color information (for example, a color histogram) is registered in the database in a normalized state so as to be comparable regardless of the size of a person region (the number of pixels).

Next, FIG. 2 illustrates an example of a query image. It is assumed that a person 30 wears a white T-shirt and black pants. If an image 3 is received as a query image, a clothing region of the person 30 in the query image is divided into an upper region 31 and a lower region 32. Then, an image including a captured image of a similar person is searched for from the database by using color information that is extracted from the upper region 31 and color information that is extracted from the lower region 32.

At this time, there is a possibility that the image 1 and the image 2 are extracted from the database since both the clothes (the white T-shirt and the black pants) of the person 10 in the image 1 illustrated in FIG. 1A and the clothes (the white one-piece dress and the black tights) of the person 20 in the image 2 illustrated in FIG. 1B are similar to the clothes (the white T-shirt and the black pants) of the person 30. As described above, it is not possible to distinguish the clothes of the person 10 from the clothes of the person 20 by the combination of the techniques in the related art, and as a result, it is not possible to narrow down the search results.

Thus, according to an aspect, it is desirable to further narrow down search results when an object is searched for from video that is captured by a camera.

Hereinafter, a detailed description will be given of exemplary embodiments. The following respective embodiments may be appropriately combined without causing contradiction in content of processing. Hereinafter, a description will be given of the respective embodiments with reference to drawings.

According to the technique disclosed in the embodiments, it is possible to divide a person region into a plurality of image regions at a more effective ratio in order to narrow down search results. According to the embodiments, the clothes (the white T-shirt and the black pants) of the person 10 in the image 1 illustrated in FIG. 1A is distinguished from the clothes (the white one-piece dress and the black tights) of the person 20 in the image 2 illustrated in FIG. 1B, and search results are further narrowed down and output in the case of receiving the query image 3 including a captured image of the person 30 (the white T shirt and the black pants). In the following description, the technique disclosed in the embodiments is configured to extract only the image 1 from the database in relation to the query image 3.

Here, a method of dividing a person region at a specific ratio is considered as a simple method of dividing the person region without depending on discontinuity in the clothes. Although the following description is given of an example in which the person region is divided, the similar result is achieved even in a case in which a clothing region excluding a head region is divided.

Figure 3A:
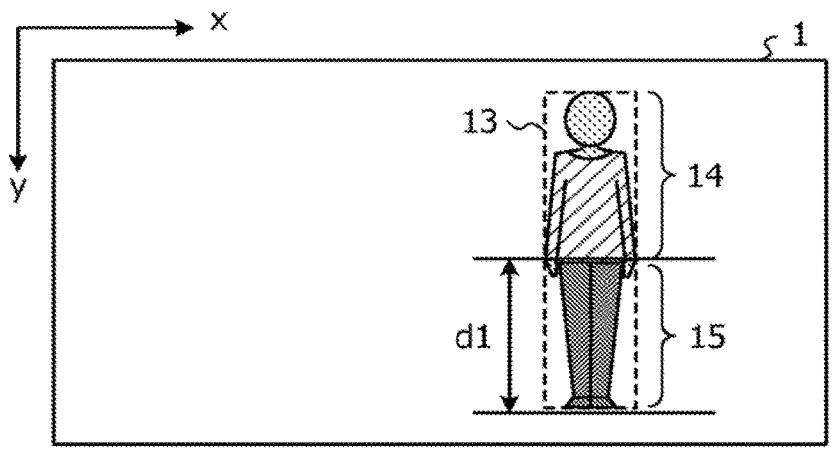
FIGS. 3A and 3B illustrate an example in which a person region in an image illustrated in FIGS. 1A and 1B is divided at specific proportions.
Figure 3B:
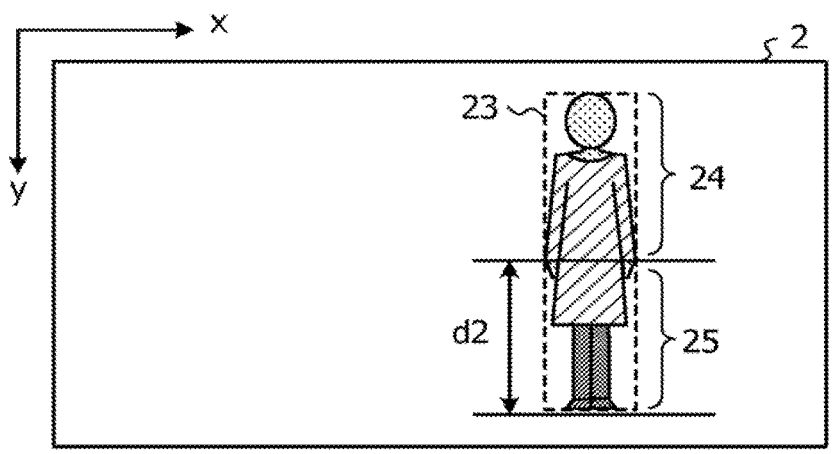

FIGS. 3A and 3B illustrate examples in which person regions in the images illustrated in FIGS. 1A and 1B are divided at specific proportions. In FIGS. 3A and 3B, the horizontal direction is represented by an x coordinate, and the height direction is represented by a y coordinate. FIG. 3A illustrates an example in which a person region 13 of the person 10 in the image 1 illustrated in FIG. 1A is vertically divided at a height d1. The height d1 is calculated by multiplying the length (height) of the person region 13 in the y direction by a specific ratio. In such a case, the person region 13 in the image 1 is divided into an upper region 14 and a lower region 15 at a position corresponding to the height d1.

In contrast, FIG. 3B illustrates an example in which a person region 23 of the person 20 in the image 2 illustrated in FIG. 1B is divided at a height d2. The height d2 is calculated by the length (height) of the person region 23 in the y direction by a specific ratio. The person region 23 in the image 2 is divided into an upper region 24 and a lower region 25 at a position corresponding to the height d2.

In this case, color information (color histogram) that is generated from the lower region 15 in the image 1 and color information (color histogram) that is generated form the lower region 25 in the image 2 differ from each other more significantly as compared with those in the related art, for example. Therefore, there is a high possibility that search results are generated on the assumption that the image 1 is distinguished from the image 2 when images of persons wearing similar clothes to those of the person in the query image 3 are searched for.

A description will be given of an example in which video (images) in a wide range captured by a camera such as a monitoring camera are searched for by using a query image. Typically, a monitoring camera is attached to an upper part of a facility and captures images of a street, a hall way, or the like below from the upper part in many cases. That is, the monitoring camera captures an image in a state in which a depression angle is set with respect to a certain horizontal plane of an imaging target, and the monitoring camera rarely captures images of a person who is in a position directly opposite the monitoring camera. If a person region of such an image captured by the camera is divided at specific proportions, the following problem occurs.

FIGS. 4A, 4B, and 5A to 5D are diagrams for describing a problem that occurs due to positional relationship between a camera and a person. FIG. 4A illustrates an example in which the camera captures an image of a person who is present near the camera. In contrast, FIG. 4B illustrates an example in which a similar camera captures an image of the same person as the person in FIG. 4A, who is present at a location away from the camera.

Figure 5A:
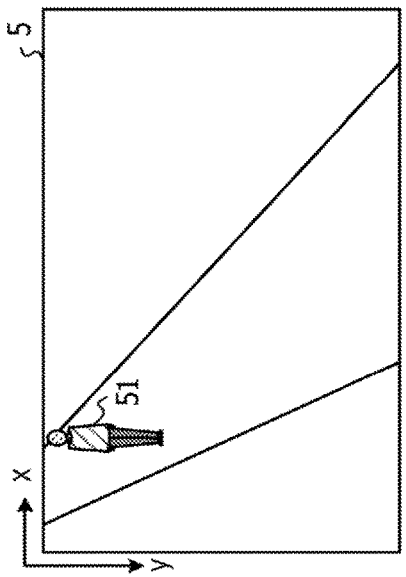
FIGS. 5A to 5D are diagrams for describing the problem that is caused by the positional relationship between the camera and the person (part 2)
Figure 5B:
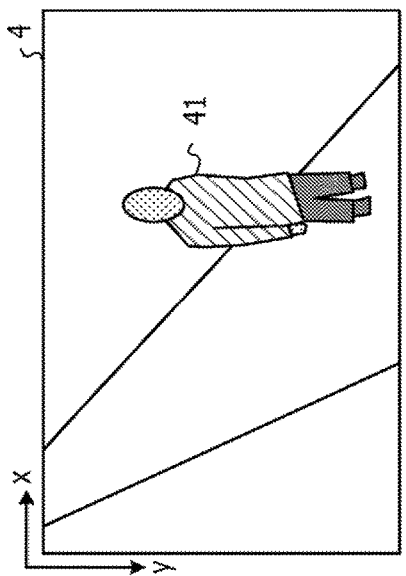

FIG. 5A illustrates an image that is captured in the state of FIG. 4A, and FIG. 5B illustrates an image that is captured in the state of FIG. 4B. It is assumed that a person 41 in FIG. 5A is the same as a person 51 in FIG. 5B. In an image 4 in FIG. 5A, a proportion of an upper body of the person 41 is greater than that of a lower body. In contrast, the proportion of the lower body of the person 51 becomes greater in an image 5 in FIG. 5B as compared with that in FIG. 5A.

This is caused by an influence of perspective projection. That is, proportions of the upper body and the lower body of the person who is present at a distance in the image are close to actual proportions of the upper body and the lower body of the person since the person who is present at a distance is projected substantially in parallel, as illustrated in FIGS. 4A and 4B. If the person is present near the camera in contrast, parallel projection is not performed, and a proportion of a portion (upper body) that is present near the camera becomes greater than a proportion of a portion (lower body) that is present at a distance from the camera in projection.

Figure 5C:
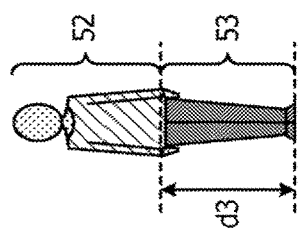
Figure 5D:
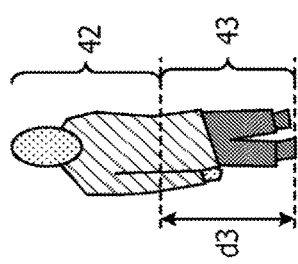

FIG. 5C is an enlarged view of a person region that corresponds to the person in FIG. 5A. FIG. 5D is an enlarged view of a person region that corresponds to the person in FIG. 5B. In FIGS. 5C and 5D, the horizontal direction is represented by an x coordinate, and the height direction is represented by a y coordinate in the same manner as in FIGS. 5A and 5B. In FIGS. 5C and 5D, person regions are normalized with respect to the height direction to cause the lengths of the person regions in the y direction to be the same for comparison.

If the person regions are divided at a specific ratio from lower ends thereof as illustrated in FIGS. 5C and 5D, the person region in FIG. 5C is divided into an upper region 42 and a lower region 43 at a position corresponding to a height d3. Similarly, the person region in FIG. 5D is divided into an upper region 52 and a lower region 53 at a position corresponding to the height d3.

If the person region is divided at the height d3 that represents the specific ratio as illustrated in FIGS. 5C and 5D, feature information (color information) extracted from the upper region and the lower region of the same person differs between images depending on the positional relationships between the camera and the person. Therefore, there is a high possibility that it is difficult to search for a person in the same clothes (same person) from video when one of the images is received as a query image.

There is a possibility that, unless a camera captures an image of the person being in a position directly opposite the person, the target image is missing from search results though the problem in the related art may be solved, if the dividing position of the person region is determined at the specific ratio as described above.

Thus, according to the technique disclosed in the embodiments, a ratio at which an image region of an object is divided is determined in consideration of differences in how an image of the object is viewed that are caused by positional relationships between the camera and the object. More specifically, an attention is paid to a fact that the differences in how an image of the object is viewed occur in accordance with an installation height of the camera, inclination (depression angle) of the camera, and a distance between the camera and the object, and thus the ratio at which the image region of the object is divided is adaptively determined in accordance with positional relationships between the camera and the object.

First Embodiment

Figure 6:
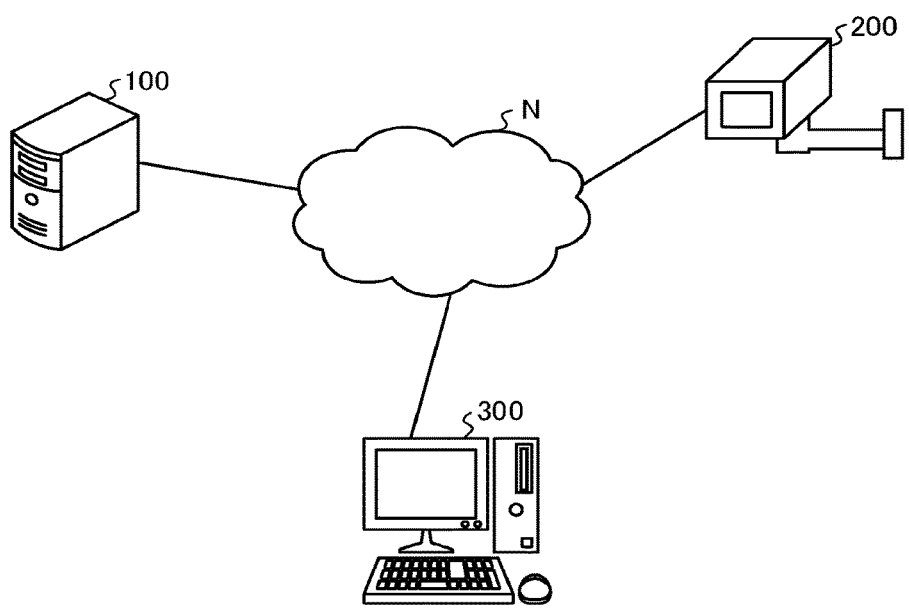
FIG. 6 is a configuration diagram of a monitoring system according to an embodiment.

FIG. 6 is a configuration diagram of a monitoring system according to this embodiment. The monitoring system includes a search apparatus 100, a camera 200, and a communication apparatus 300. The respective apparatuses are connected to each other via a network N. The network N is the Internet, for example. In addition, the search apparatus 100 and the camera 200 may be connected by a dedicated line.

The camera 200 is a monitoring camera that is installed in a town or a facility and captures video for a certain period of time. The video captured by the camera 200 is transmitted to the search apparatus 100 in real time or at a predetermined time interval. In addition, a plurality of cameras 200 may be provided. The camera is an example of the imaging device.

The communication apparatus 300 is a computer that is operated by a user. The user operates the communication apparatus 300, designates an image including a captured image of a person as a search target (hereinafter, referred to as a query image), and requests the search apparatus 100 to search for an image including, with a high possibility, a captured image of the person as the search target. The query image may be one of images in the video that the camera 200 captures or may be an image that another camera captures, for example. The communication apparatus 300 is a personal computer (hereinafter, referred to as a PC), a mobile phone, a smart phone, a tablet PC, or the like.

The search apparatus 100 is a computer for managing the video that is obtained from the camera 200 and searching for a desired image from the video. For example, the search apparatus 100 is a server. The search apparatus 100 analyzes the video that is obtained from the camera 200 and divides a person region in each image into at least two image regions. Then, the search apparatus 100 generates feature information such as color information (color histogram) from each image region. Then, the search apparatus 100 stores the feature information of each image region in a database.

If the search apparatus 100 receives a search request including a query image that includes a captured image of a person as a search target from the communication apparatus 300, then the search apparatus 100 divides a person region in the query image into at least two image regions. Then, the search apparatus 100 searches for an image including a captured image of a person in similar clothes to those of the person in the query image by matching feature information generated from each image region in the query image with the feature information that is stored in the database. The embodiment is not limited to the aforementioned configuration in which the feature information is created in advance in the database, and the search apparatus 100 may search for the image including a captured image of the person in the similar clothes to those of the person as the search target from the video received from the camera in real time after receiving the search result.

As described above, the search apparatus 100 divides the person region in the query image that is included in the search request into at least two image regions and generates feature information of each image region. Then, the search apparatus 100 generates feature information from the video that is received from the camera 200 when desired and matches the feature information with the feature information that is generated from the query image. Therefore, the search apparatus 100 may seek or track a person in real time.

Figure 7:
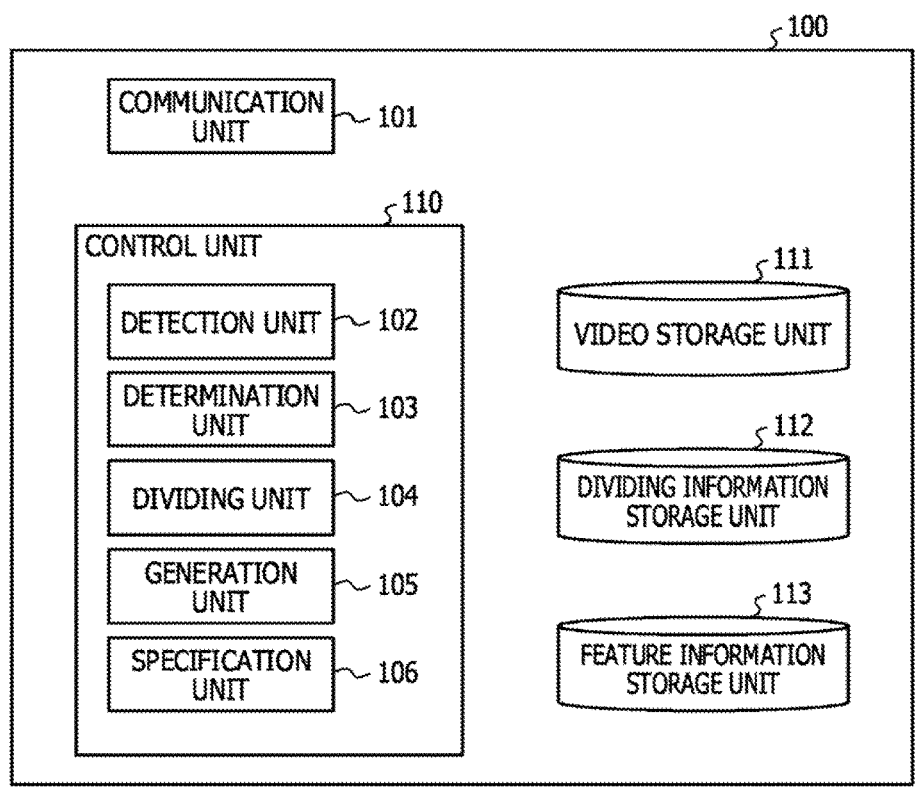
FIG. 7 is a functional block diagram of a search apparatus.

FIG. 7 is a functional block diagram of the search apparatus. The search apparatus 100 includes a communication unit 101, a control unit 110, a video storage unit 111, a dividing information storage unit 112, and a feature information storage unit 113.

The communication unit 101 exchanges information with the camera 200 and the communication apparatus 300 via the network N. For example, the communication unit 101 receives video (video information) that includes a plurality of images (image information) from the camera 200. In addition, the communication unit 101 receives a search request from the communication apparatus 300 and transmits a search result in response to the search request to the communication apparatus 300.

The control unit 110 controls various kinds of processing performed by the search apparatus 100. Furthermore, the control unit 110 includes a detection unit 102, a determination unit 103, a dividing unit 104, a generation unit 105, and a specification unit 106.

The detection unit 102 detects an object to be focused from an image. According to the embodiment, the detection unit 102 detects a person, in particular, from an image by using a technique of detecting a person from an image and sets a person region that includes the person. The image is each of the frames in video that is received from the camera or a query image that is included in the search request.

The determination unit 103 determines a parameter in consideration of how an object is viewed in the captured image. Furthermore, the determination unit 103 determines a dividing ratio by correcting a predetermined ratio with the parameter. According to the embodiment, dividing ratios that are corrected with the parameter are prepared in advance, and the determination unit 103 determines an appropriate dividing ratio from among the prepared dividing ratios.

The differences in how the object is viewed in the captured image occur due to the height at which the camera 200 is installed, the inclination of the camera 200, and the distance from the camera 200 to the object (person) as described above. For example, the determination unit 103 may divide an object image that is captured in a first positional relationship and an object image that is captured in a second positional relationship into an upper body and a lower body in each image by taking how the object is viewed into consideration.

The respective image regions after the division include substantially the same range of the object (person) by dividing the person regions at the dividing ratio that is determined by the determination unit 103 even if the positional relationships between the person and the camera differ from each other as illustrated in FIGS. 4A and 4B. A detailed description will be given later.

The dividing unit 104 divides each person region into at least two image regions at the dividing ratio in accordance with the parameter. The embodiment will be described on the assumption that the dividing unit 104 divides the person region (including a head portion and a body portion) into two image regions (an upper region and a lower region) in accordance with the dividing ratio. However, the dividing unit 104 may divide a region obtained by excluding the head portion from the person region into at least two image regions.

The generation unit 105 generates feature information for each of the divided image regions. According to the embodiment, the feature information is color information, and a description will be given of a case of a color histogram, in particular. Therefore, the generation unit 105 generates a color histogram of each image region by using RGB values of the respective pixels included in each image region. Here, if the image as a processing target is an image that is obtained from the camera 200, the generated feature information is stored in the feature information storage unit 113 along with information of each image region. In contrast, if the image as the processing target is a query image, the generated feature information is output to the specification unit 106 along with the information of each image region.

The specification unit 106 specifies in the video an image including a captured image of an object that is similar to the object to be focused based on the feature information of each image region. Specifically, the specification unit 106 matches the color histogram of each of the image regions (upper region and the lower region) in the query image with the information that is stored in the feature information storage unit 113. Then, the specification unit 106 specifies an image that includes an upper region that has similarity in a predetermined level or higher with the color histogram of the upper region in the query image and a lower region that has similarity in a predetermined level or higher with the color histogram of the lower region in the query image. That is, the specification unit 106 specifies that the image includes a captured image of a person in similar clothes to those of the person as the search target in the query image.

A video storage unit 111 stores video information about the video that is obtained from the camera 200. For example, the video storage unit 111 stores image information of the respective images that form the video.

The dividing information storage unit 112 stores dividing information that is referred to when a dividing position is determined. A detailed description will be given later. If a plurality of cameras 200 are present, dividing information is stored for each camera 200 with different installation conditions (heights and depression angles).

The feature information storage unit 113 stores feature information of each of the image regions that are obtained by dividing the person region in each image. A detailed description will be given later.

Figure 8:
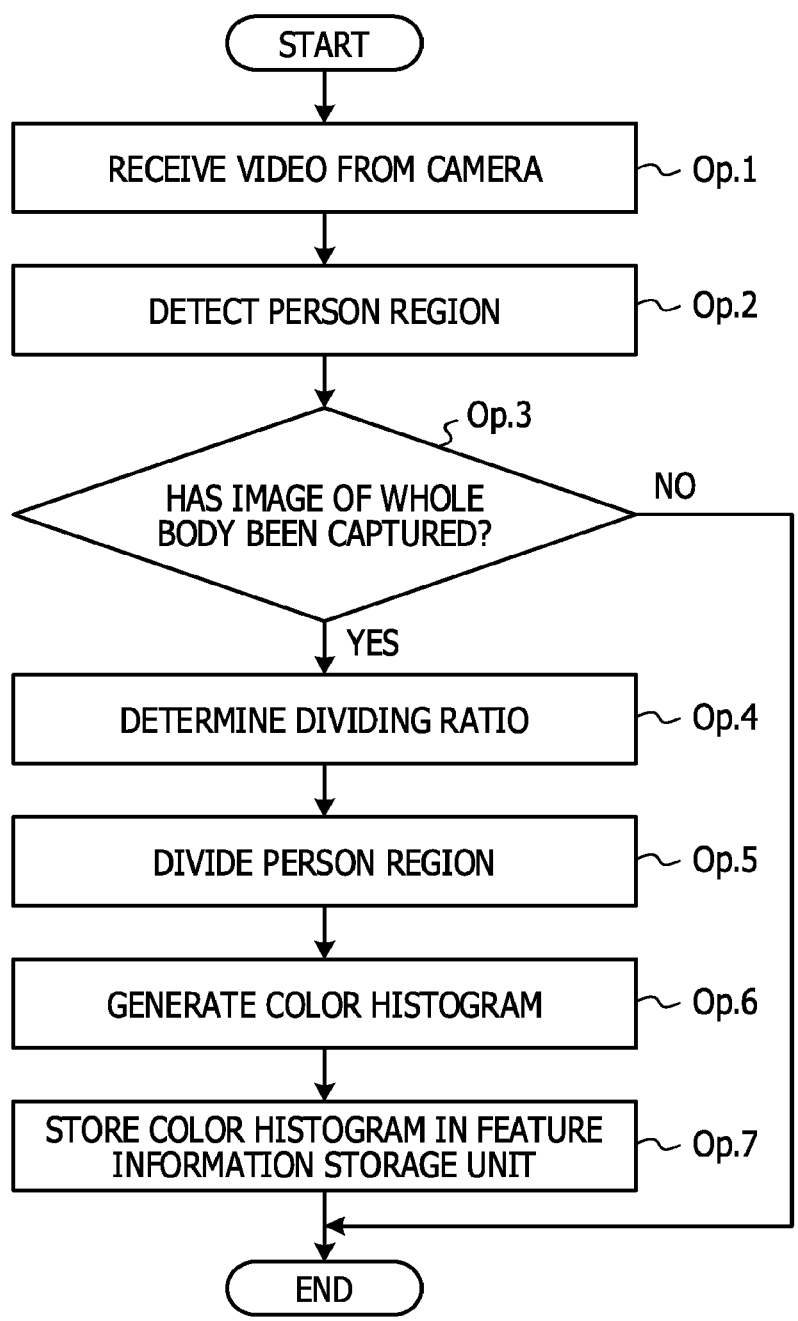
FIG. 8 is a processing flow of the search apparatus (part 1)

FIG. 8 is a processing flow of the search apparatus (part 1). The processing illustrated in FIG. 8 is registration processing in the feature information storage unit 113.

If the communication unit 101 receives video (video information) from the camera 200 (Op. 1), then the control unit 110 executes the following processing. The control unit 110 stores image information of each of a plurality of frames (images) that form the received video in the video storage unit 111. In addition, the control unit 110 may store image information at a predetermined frame interval in the video storage unit 111 instead of storing the entire image information.

FIG. 9 is an example of a data configuration in the video storage unit. The video storage unit 111 associates and stores image identification information for identifying the images with the image information. Furthermore, the video storage unit 111 may also store imaging time of the image information, identification information of the camera to be used for capturing the images, and the like.

Next, the detection unit 102 detects a person region in an image (image information) as a processing target (Op. 2). The detection unit 102 detects the person region by using a method disclosed in Japanese Laid-open Patent Publication No. 2014-93023, for example. Specifically, the detection unit 102 detects a person in the image by using an identifying device such as an AdaBoost or a support vector machine and sets a region including the person as a person region.

As another method of detecting a person in an image, a method disclosed in Navneet Dalal, and Bill Triggs, "Histograms of oriented gradients for human detection", *IEEE Conf. on Computer Vision and Pattern Recognition*, Vol. 1, pp. 886-893, 2005 or a method disclosed in Yuji Yamauchi, et al., "Human Detection Based on Statistical Learning from Image", *Journal of The Institute of Electronics, Information and Communication Engineers*, Vol. J96-D, No. 9, p.p. 2017-2040 may be used.

Figure 10:
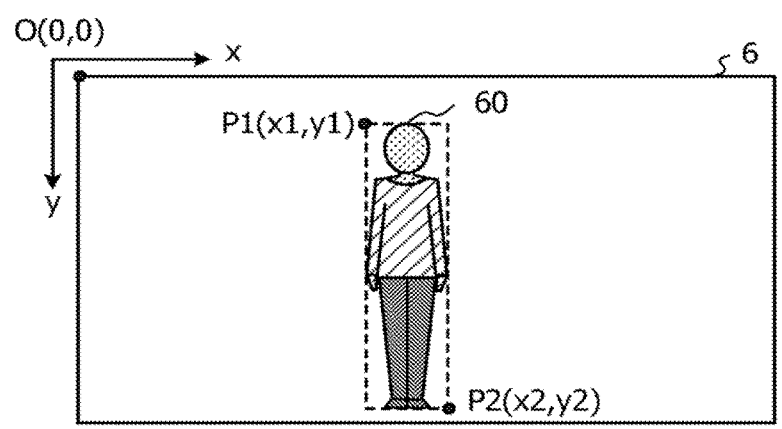
FIG. 10 is a diagram for describing a person region and a position thereof.

FIG. 10 is a diagram for describing a person region and a position thereof. In FIG. 10, the horizontal direction is represented by an x coordinate, and the vertical direction (height direction) is represented by a y coordinate. A region 60 is a person region that is detected in an image 6. The person region 60 is a rectangular region represented by upper left coordinates P1 (x1, y1) and lower right coordinates P2 (x2, y2), for example. A pixel of the upper left end corresponds to an origin O (0, 0) in the image 6.

Returning to FIG. 8, the detection unit 102 determines whether or not an image of a whole body of the person has been captured (Op. 3). By the processing, an image of a person, a part of which is not captured by the camera 200 and an image of a person who is present behind another person or another object are excluded from targets of the processing (Op. 3: NO). In the case of using the identifying device that has learned features of the whole body of the person in advance as in the method disclosed in Japanese Laid-open Patent Publication No. 2014-93023, only a person region of a person whose whole body image has been captured is detected at the timing of Op. 2. Therefore, Op. 3 is omitted in such a case.

If an image of the whole body of the person has been captured (Op. 3: YES), the determination unit 103 determines a dividing ratio of the person region (Op. 4). According to the embodiment, the determination unit 103 determines a dividing position in accordance with a position of the person region in the image as the processing target (the image 6 in the case of FIG. 10) from the dividing information that is prepared in advance. The position of the person region is, for example, the lower right coordinates P2 (x2, y2) of the person region 60 illustrated in FIG. 10.

Figures 11A, 11B:
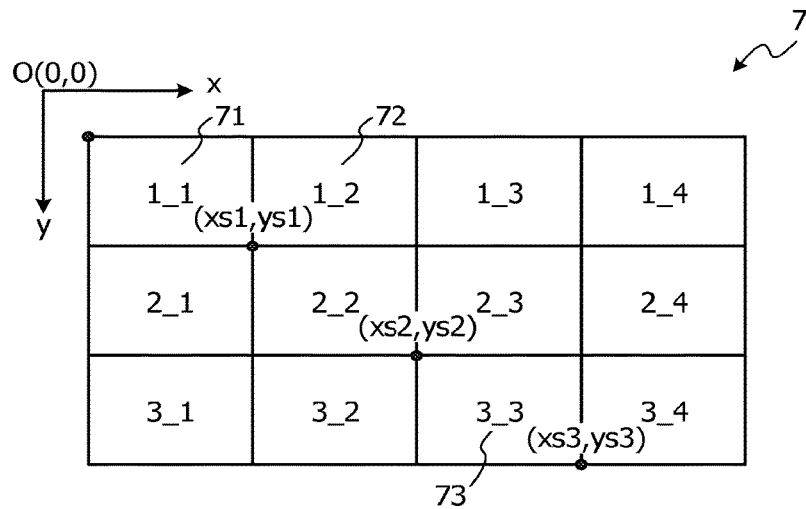
FIGS. 11A and 11B are diagrams for describing dividing information.

FIGS. 11A and 11B are diagrams for describing dividing information. FIG. 11A is an example of a data configuration in the dividing information storage unit. In addition, FIG. 11A illustrates an example of the dividing information storage unit 112 in the case of dividing a person region into two image regions.

The dividing information storage unit 112 stores dividing information in which segment identification information, coordinates 1, coordinates 2, and a dividing ratio are associated. If a plurality of cameras 200 are present, the dividing information storage unit 112 stores such dividing information for each camera 200. In such a case, camera identification is stored with each dividing ratio. The camera identification information is information that indicates a camera under the same installation conditions from among the plurality of cameras 200 as described above. The dividing information storage unit 112 separately stores a value of the dividing ratio in association with the camera identification information. Even if a plurality of cameras 200 are present, the dividing information storage unit 112 may store the dividing information illustrated in FIG. 11A, in which the value of the dividing ratio is stored, for each camera.

The segment identification information is information for identifying each segment in a case in which an image is divided into a plurality of segments. The coordinates 1 are upper left coordinates of a segment that is indicated by the segment identification information. The coordinates 2 are lower right coordinates of the segment that is indicated by the segment identification information. Values of the coordinates 1 and the coordinates 2 are represented as values of absolute coordinates in the entire image by regarding a predetermined point (a pixel at the upper left end of the image, for example) as the origin. FIG. 11B is a diagram for describing a segment. A segment is a unit region with the same size, and the entire image 7 is divided into the segments. In the example of FIG. 11B, twelve unit regions including a segment 71, a segment 72, and a segment 73 are set. The number of unit regions to be divided may be appropriately set in accordance with installation conditions of the camera or a capturing range in accordance with a specification of the camera, for example.

In the example of FIG. 11A, upper left coordinates (0, 0) and lower right coordinates (xs1, ys1) of the segment 71 are stored as the coordinates 1 and the coordinates 2 in association with segment identification information "1_1" for identifying the segment 71. Furthermore, upper left coordinates (xs2, ys2) and lower right coordinates (xs3, ys3) of the segment 73 are stored as the coordinates 1 and the coordinates 2 in association with segment identification information "3_3" for identifying the segment 73.

Next, the dividing ratio is a ratio that is used for the division of the person region in a case in which a position (the lower right coordinates P2, for example) of the person region is included in the segment. A dividing ratio "0.50" indicates that the person region is divided at a height dy (a position in the y direction) corresponding to 0.50 from a lower end of the person region on the assumption that the length of the person region in the y direction is 1. In a case of dividing the person region into three image regions, ratio information becomes a:b:c. A method of generating the dividing information will be described later.

It is possible to determine a dividing ratio in consideration of how the object is viewed depending on a positional direction between the camera 200 and the object (person) by defining the dividing ratio for each segment as described above. As illustrated in FIG. 11A, the dividing ratio of the segment 71 illustrated in FIG. 11B is 0.50, and this indicates that the person region is vertically divided at a ratio of 50 (upper side):50 (lower side) in a case in which the position of the person region is included in the segment 71. In addition, the dividing ratio of the segment 73 is 0.34, and this indicates that the person region is vertically divided at a ratio of 66 (upper side):34 (lower side) in a case in which the position of the person region is included in the segment 73.

Figure 12A:
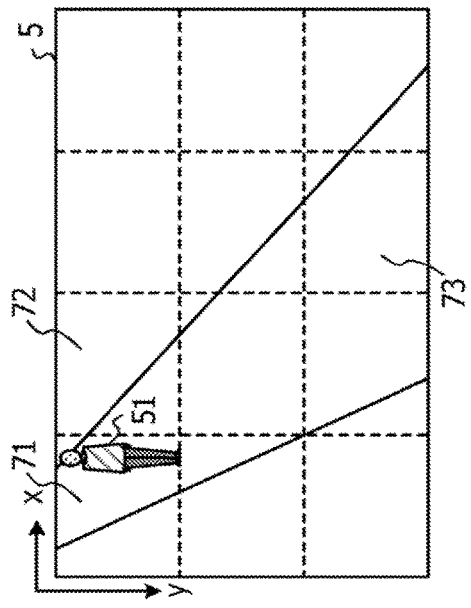
FIGS. 12A to 12D are diagrams for describing relationships between dividing ratios and how images are viewed.
Figure 12B:
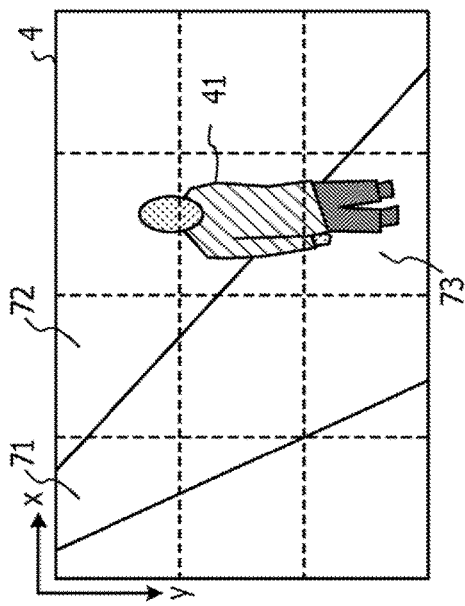
Figure 12C:
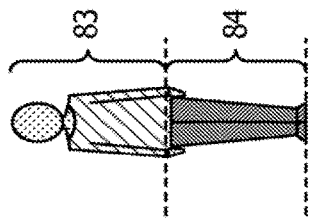
Figure 12D:
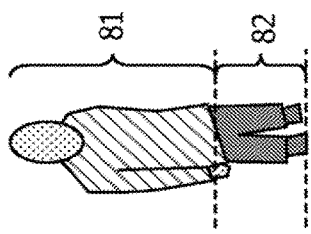

FIGS. 12A to 12D are diagrams for describing relationships between dividing ratios and how the object is viewed. FIG. 12A is a diagram illustrating the image 4 in FIG. 5A in an overlapped manner with the segments in FIG. 11B, and FIG. 12B is a diagram illustrating the image 5 in FIG. 5B in an overlapped manner with the segments in FIG. 11B. In FIGS. 12A and 12B, borders of segments are represented by dotted lines. FIG. 12C is an enlarged view of the person region in the image illustrated in FIG. 12A. FIG. 12D is an enlarged view of the person region in the image illustrated in FIG. 12B.

As illustrated in FIG. 12A, the person region is included in the segment 73 in the image 4. Therefore, the person region is divided into two image regions 81 and 82 at a ratio of 66 (upper side):34 (lower side) as illustrated in FIG. 12C by using the dividing ratio "0.34" of the segment 73.

In contrast, the person region is detected at the position of the segment 71 in the image 5 as illustrated in FIG. 12B. Therefore, the person region is divided into two image regions 83 and 84 at the ratio of 50 (upper side):50 (lower side) as illustrated in FIG. 12D by using the dividing ratio of the segment 71.

By dividing the person regions as described above, ranges of the person included in the upper regions and ranges of the person included in the lower region of the person regions in the respective images become substantially the same even in a case in which an image of the same person is captured at different positions. Therefore, if color histograms are generated for the upper regions and the lower regions in the respective images and one of the images of the same person is used as a query image, then the other image may be searched for.

Returning to FIG. 8, the dividing unit 104 divides the person region into at least two image regions by using the dividing ratio that is determined in accordance with the position of the person region (Op. 5). For example, the dividing unit 104 determines a dividing position (y coordinate) by using the dividing ratio and divides the person region into two image regions at the dividing position. The dividing position yd that is determined based on the dividing ratio z is obtained by the following Equation 1. As illustrated in FIG. 10, y1 is the minimum value of the y coordinate of the person region, and y2 is the maximum value of the y coordinate of the person region.

$$yd = (y2-y1) \times (1-z) + y1 \qquad \text{(Equation 1)}$$

Then, the generation unit 105 generates color histograms by using color information of the respective image regions (Op. 6). The color histograms may be generated for each of R, G, and B, or the number of corresponding pixels may be counted for each combination of R, G, and B. The generation unit 105 generates color histograms in which the numbers of pixels in the image regions are normalized to a fixed value.

Then, the generation unit 105 stores the color histograms of the respective image regions in the feature information storage unit 113 (Op. 7). FIG. 13 is an example of a data configuration in the feature information storage unit 113. The feature information storage unit 113 stores the image identification information, the person region identification information, the image region identification information, the coordinates 1, the coordinates 2, and the color histograms (feature information) in an associated manner.

The image identification information is information for identifying each of images that form video. It is possible to obtain image data of a specific image by using the image identification information as a key and searching the video storage unit 111. The person region identification information is information for identifying persons whose images are captured in a single image from each other. If a plurality of person regions are detected in a single image, for example, the detection unit 102 provides person region identification information with different content for uniquely identifying each of the person regions.

The image region identification information is information for identifying each of image regions when a person region is divided into at least two image regions. According to the embodiment, image region identification information "1" is provided to the upper region, and image region identification information "2" is provided to the lower region. Therefore, a combination of person region identification information and image region identification information makes it possible to specify a person region and an image region therein in a single image.

The coordinates 1 and the coordinates 2 are information that indicates a position of each image region and correspond to upper left coordinates and lower right coordinates of each image region, for example. The coordinates 1 and the coordinates 2 may be coordinate values in the same coordinate system as that of the aforementioned coordinates 1 and the coordinates 2 in FIG. 11A. For example, FIG. 13 illustrates an example in which a person region represented by upper left coordinates (x1, y1) and lower right coordinates (x2, y2) is divided into two image regions, namely the upper region and the lower region at a position corresponding to a y coordinate "yd1".

The color histogram is information of a color histogram of each image region. As described above, a color histogram as feature information is associated and stored with each image region of a person region in each image.

By the aforementioned processing, feature information is generated from video (images included therein) and is then stored in the feature information storage unit 113. Therefore, it is possible to search for an image, in which a person in the same clothes as those of the person as the search target by searching the feature information storage unit 113 in this embodiment.

In a case in which video that is obtained by the camera 200 is searched for when desired, Op. 7 in the processing illustrated in FIG. 8 is not executed. Instead, the feature information that is generated from the query image is matched with the feature information that is generated from the video obtained when desired.

Figure 14:
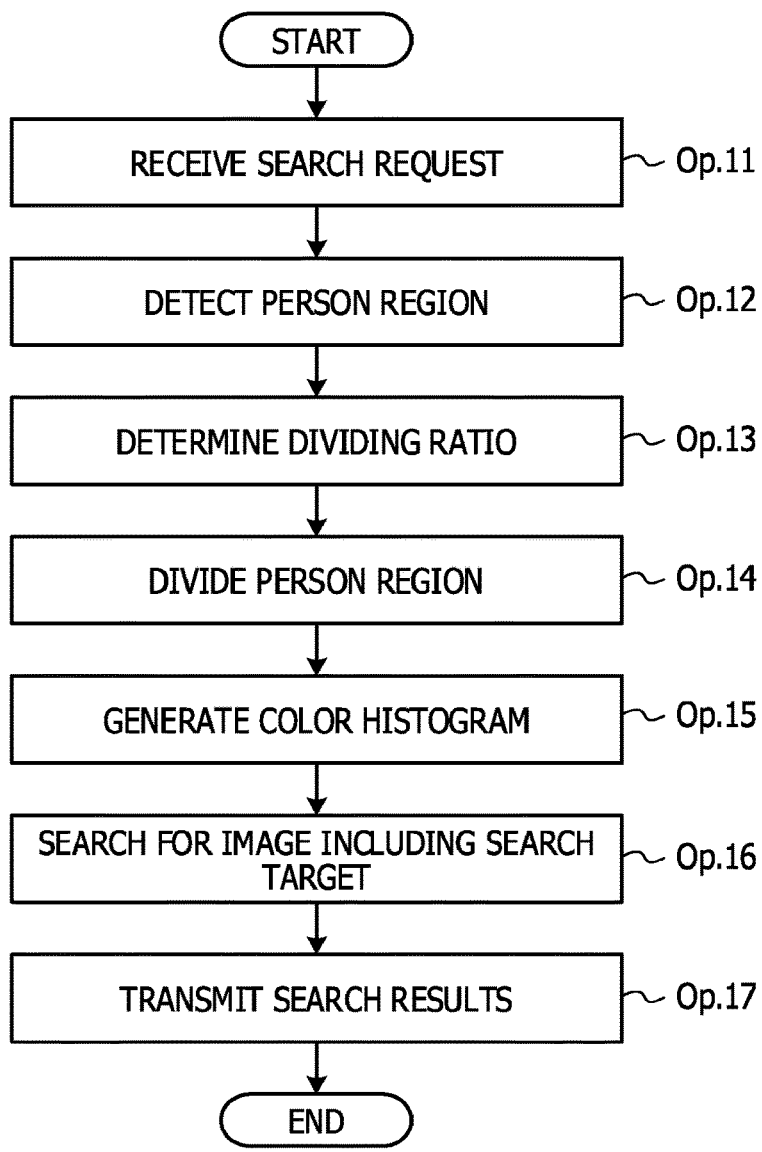
FIG. 14 is a processing flow of the search apparatus (part 2)

Next, FIG. 14 is a processing flow of the search apparatus (part 2). The processing illustrated in FIG. 14 is search processing. The communication unit 101 receives a search request including a query image from the communication apparatus 300 (Op. 11). The query image may be one of images in the video that is obtained from the camera 200 or may be an image that is captured by another camera. In the former case, it is possible to track a specific person. In the latter case, it is possible to search for a specific person.

Then, the detection unit 102 detects a person region in the query image (Op. 12). A method of detecting the person region by the detection unit 102 is the same as that used in Op. 2. The determination unit 103 determines a dividing ratio of the person region (Op. 13). A method of determining the dividing ratio by the determination unit 103 is the same as that used in Op. 4. That is, the determination unit 103 obtains the dividing ratio corresponding to a segment, which includes the lower right coordinates of the person region, from the dividing information storage unit 112.

The dividing unit 104 divides the person region into at least two image regions by using the determined dividing ratio (Op. 14). The dividing processing performed by the dividing unit 104 is the same as that performed in Op. 5. The generation unit 105 generates color histograms by using image information of the respective image regions (Op. 15). The processing of generating the color histograms by the generation unit 105 is the same as that performed in Op. 6.

Next, the specification unit 106 searches the feature information storage unit 113 by using the color histograms of the respective image regions that are generated from the query image in Op. 6 (Op, 16). At this time, the specification unit 106 performs the searching separately in the upper region and the lower region, which are image regions that are divided from the query image by the dividing unit 104. Specifically, the specification unit 106 matches the color histogram of the upper region with a color histogram that is associated with the image region identification information "1" in the feature information storage unit 113, for the upper region. In contrast, the specification unit 106 matches the color histogram of the lower region with color a histogram associated with the image region identification information "2" in the feature information storage unit 113, for the lower region.

If similarity between the color histogram derived from the query image and the color histogram stored in the feature information storage unit 113 is equal to or greater than a predetermined value, then the specification unit 106 determines that the image is an image including a captured image of the person in the similar clothes to those of the person in the query image. In the calculation of the similarity between color histograms, a method disclosed in Japanese Laid-open Patent Publication No. 2009-199322, for example, is used.

If a person region formed of a plurality of image regions, all of which have predetermined or higher similarity with the respective image regions in the query image, is specified in the feature information storage unit 113, the specification unit 106 obtains corresponding image information from the video storage unit 111 by using corresponding image identification information as a key.

Then, the specification unit 106 generates a search result including the image information, and the communication unit 101 transmits the search result to the communication apparatus 300 (Op, 17). If the person region formed of a plurality of image regions, which have similarity with the respective image regions in the query image, is not specified, the specification unit 106 causes the communication unit 101 to transmit a search result that indicates there is no image including a captured image of a person in the similar clothes to those of the person as the search target.

As described above, the search apparatus 100 may also divide the person region in the query image in consideration of the positional relationship between the camera 200 and the object. In other words, the person region is divided such that substantially the same ranges of an object are included in consideration of differences in how the object is viewed that are caused by positional relationships between the camera and the object by using the dividing ratio according to the embodiment.

Therefore, it is possible to propose further narrowed down search results to the user as compared with the technique in the related art without missing an image of the same person from the search results. The query image is preferably captured by the camera 200 or a camera under the same installation conditions as those of the camera 200. In addition, an image that is captured by a camera under slightly different installation conditions from those of the camera 200 may also be used. If so, the effect related to the search results may be achieved to some extent.

Method of Generating Dividing Information According to First Embodiment (Part 1)

Next, a description will be given of some of methods of generating dividing information according to the first embodiment. First, a description will be given of a method of generating dividing information by learning relative relationships between how a specific person is viewed and the respective positions of the person when an image of the person (same person) is captured in various positional relationships with the specific camera 200.

An operator who has installed the camera, or an administrator of the monitoring system, and the like move in the imaging range of the camera 200. At this time, the camera 200 captures video including a plurality of images in which the camera 200 and the operator (or the administrator) are in various positional relationships. Then, the search apparatus 100 estimate how the person looks for each of the positions of the same person in each of the plurality of images based on a variation in luminance of the images, and generates dividing information by using the estimated results. The learning processing is executed by the control unit 110 in the search apparatus 100.

Figure 15B:
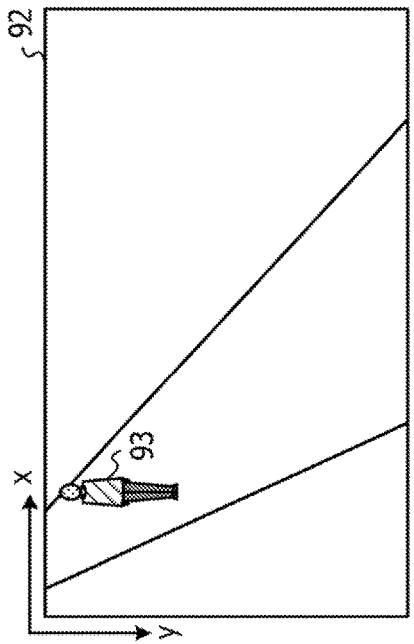
FIGS. 15A to 15D are diagrams for describing a method of generating dividing information (part 1)
Figure 15D:
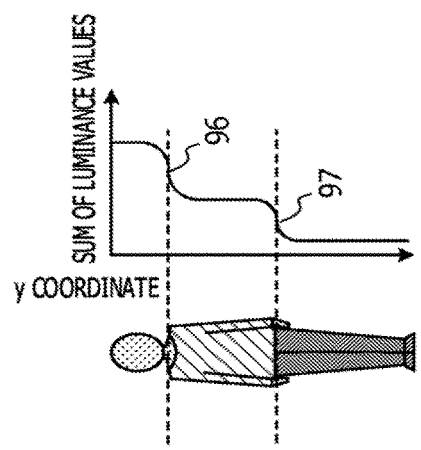
Figure 15A:
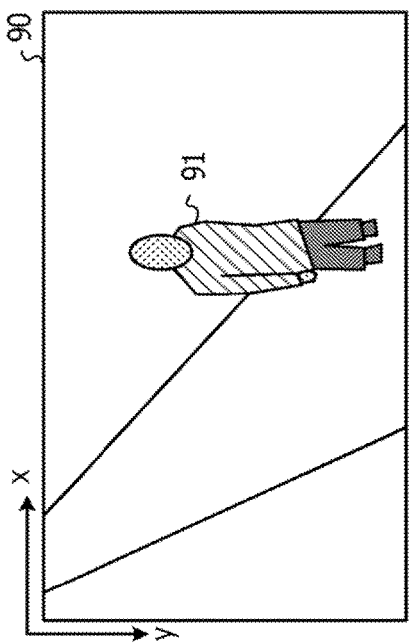

FIGS. 15A to 15D are diagrams for describing a method of generating the dividing information (part 1). In an image 90 illustrated in FIG. 15A and an image 92 illustrated in FIG. 15B, images of the person 91 and the person 93, who are the same person, are captured. However, these two images are captured in states in which the positional relationships between the camera 200 and the object (the person 91 and the person 93) differ from each other in the same manner as in FIGS. 5A and 5B. In FIGS. 15A and 15B, the horizontal direction is represented by an x coordinate, and the height direction is represented by a y coordinate.

Figure 15C:
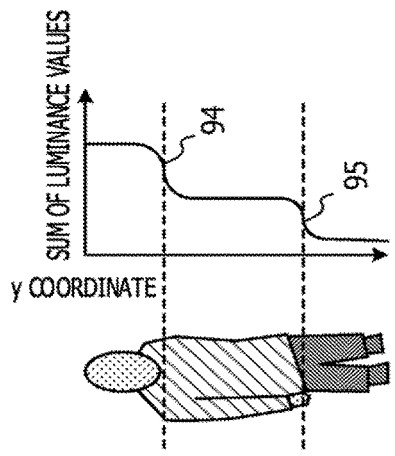

FIG. 15C is an enlarged view of a person region in the image 90 and illustrates a variation in luminance in the y direction. FIG. 15D is an enlarged view of a person region in the image 92 and illustrates a variation in luminance in the y direction. It is assumed that the person regions are detected by the aforementioned method. In FIGS. 15C and 15D, lines that represent the variation in luminance is simply illustrated.

The variation in luminance in the y direction may be obtained by obtaining differences in sums of luminance values of a plurality of pixels, which are aligned in the x direction of the respective y coordinates, of adjacent y coordinates. Then, the control unit 110 specifies a y coordinate at which the variation in luminance is the maximum. For example, it is expected that a border (94 and 96) between a head portion and a body or a position (95 and 97) between a T-shirt and pants is specified. Specifically, the control unit 110 obtains a position $y_{max}$ at which a variation in luminance increases, by the following Equations 2 and 3 first.

$$F(y) = \frac{\sum_{x=x_1}^{x_2} I(x, y) M(x, y)}{\sum_{x=x_1}^{x_2} M(x, y)} \quad \text{(Equation 2)}$$

$$y_{max} = \underset{y}{\operatorname{argmax}} \left| \sum_{a=1}^{A} F(y-a) - \sum_{a=1}^{A} F(y+a) \right| \quad \text{(Equation 3)}$$

F(y) is a sum of luminance values of pixels that are aligned in the horizontal direction (x direction) of a specific y coordinate. $x_1$ and $x_2$ respectively represent x coordinates of the left end and the right end of the person region, I(x, y) represents a pixel at the coordinates (x, y), and M(x, y) represents mask information of the person region. A represents a counting range, and a predetermined value such as 10 pixels is assigned. M(x, y) is set to "1" for a pixel corresponding to a person and to "0" for a pixel corresponding to a background in the person region at the coordinates (x, y)

According to the embodiment, it is expected that the y coordinate $y_{max}$, at which the variation in luminance is the maximum, in the first image from among the plurality of images including a captured image of the same person originally corresponds to a y coordinate $y_{max}'$ at which the variation in luminance is the maximum in the second image as long as the same person is in the same clothes. Therefore, it is possible to recognize relative relationships of characteristic positions of the person in the respective images in consideration of differences in how the person is viewed, which are caused by the positional relationships between the camera and the person, by obtaining the characteristic positions for the respective positions of the person regions that reflect the positional relationships between the camera 200 and the person. Here, the y coordinate at which the variation in luminance is the maximum is one of the examples of the characteristic positions.

Next, the control unit 110 calculates the dividing ratio by assigning $y_{max}$ in the following Equation 4. Here, y2 is the maximum value of the y coordinates of the person region, and y1 is the minimum value of the y coordinates of the person region. As described above, it is possible to obtain the ratio at which the image regions of the object are divided at the characteristic position for each of the positional relationships by using the characteristic position in consideration of differences in how the object is viewed, which are caused by the positional relationships between the camera and the object.

$$z = \frac{y_{max} - y2}{y2 - y1} \quad \text{(Equation 4)}$$

Here, the position between the head portion and the body (94 and 96) is also exemplified as well as the discontinuity in the clothes (95 and 97) as the position at which a variation in luminance increases as illustrated in FIGS. 15C and 15D. Therefore, the control unit 110 may specify two y coordinates at which the variation in luminance increases and employ a larger y coordinate (the y coordinate that is present on the lower side) as $y_{max}$ in order to calculate the dividing ratio z based on the discontinuity in the clothes (95 and 97) instead of the position between the head portion and the body. In a case in which a person region that includes only the body portion in a state of excluding the head portion in advance has been detected, the control unit 110 obtains $y_{max}$ at which the variation in luminance becomes the maximum.

Furthermore, since it is expected that the variation in luminance increases at an ankle regions (between shoes and pants or the like), the control unit 110 may specify three y coordinates at which the variation in luminance increases and employ the y coordinate, which is present at the intermediate position among the three y coordinates, as $y_{max}$. In the case in which the person region that includes only the body part in the state of excluding the head portion in advance has been detected, the control unit 110 may specify two y coordinates at which the variation in luminance increases and employ a smaller y coordinate (the coordinate that is present on the upper side in the image) as $y_{max}$.

Then, the control unit 110 specifies a segment in which a position (for example, the lower right coordinates) of the person region is located and stores the dividing ratio z in association with the segment in the dividing information storage unit 112. In a case in which a person region that is located in the same segment is detected in a plurality of images, an average value of the dividing ratios z that are calculated from the respective images may be obtained and regarded as a final dividing ratio z.

As described above, the control unit 110 obtains positions (y coordinates) at which the variation in luminance increases for the respective positional relationships between the camera 200 and the object, in other words, for the respective positions of the person region in the images. It is expected that the positions correspond to the same position of the body of the same person between the respective images. Therefore, it is understood that a position of the waist corresponding to the border of the clothes is projected at a specific height when a specific person is present at a specific position, and that the position of the waist is projected at another height when the specific person is present at another position. It is possible to relatively recognize the differences in how the object is viewed that are caused by the positional relationships between the camera 200 and the object and to determine the dividing ratio z that reflects the differences, by obtaining the positions, at which the variation in luminance increases, for the respective positions of the person region in the images. In a case in which the person region is divided into three or more image regions, the control unit 110 may specify two or more positions (y coordinates), at which the variation in luminance becomes equal to or greater than a threshold, by the aforementioned method. Then, the control unit 110 calculates the dividing ratio a:b:c for each position of the person region based on the two or more specified positions.

In the case in which the person region that is detected in the plurality of images that form the video or in the query image is divided by using the dividing information, processing is performed on an image including a captured image of a person who is different from the person (operator) in a learning stage. In such a case, the image is not divided at the position of the waist in some cases since the person has different physical features from those of the operator. However, this does not cause a problem.

That is, since the dividing ratio z has already been learned in consideration of the differences in how the object is viewed that are caused by the positional relationships between the camera 200 and the object, the same person, who is different from the operator, is divided at a specific position regardless of the positional relationships. Therefore, the search apparatus 100 according to the embodiment may solve the problem that was described above with reference to FIGS. 5A to 5D without excluding the same person from search results.

Figure 16:
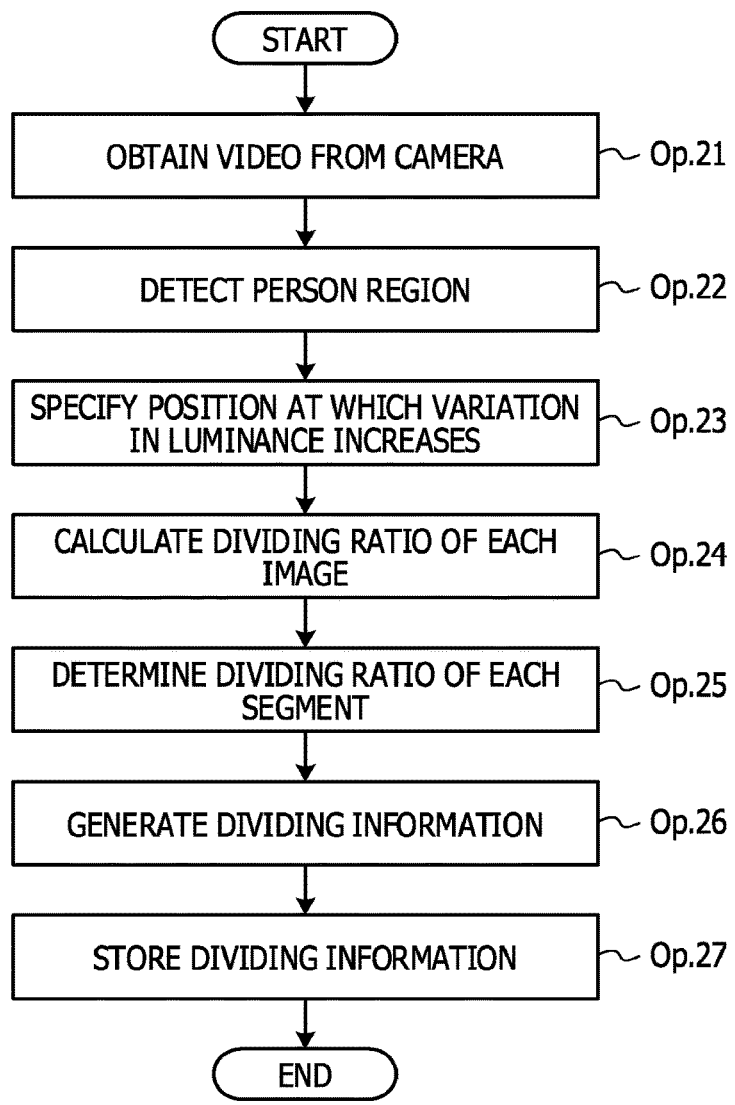
FIG. 16 is a processing flow of the method of generating the dividing information (part 1)

Next, a description will be given of a processing flow of the method of generating the dividing information (part 1). FIG. 16 is a processing flow of the method of generating the dividing information (part 1).

The control unit 110 obtains video from the camera 200 (Op. 21). Then, the control unit 110 sets one image in the video as a processing target and detects a person region from the image as the processing target (Op, 22). The processing in Op. 22 is executed by the detection unit 102 in the control unit 110 and is the same processing as that in Op. 2.

Next, the control unit 110 specifies the position ymax at which the variation in luminance increases in the person region in the y direction by using the aforementioned Equations 3 and 4 (Op. 23). Then, the control unit 110 calculates a dividing ratio z of the person region in each image as the processing target (Op. 24). Op. 22 to Op. 24 are executed on each image as a processing target.

Here, the calculated dividing ratio z of each image is temporarily stored in a learning table storage unit. The search apparatus 100 according to the embodiment further includes a learning table storage unit (not illustrated in FIG. 7). FIG. 17 is an example of a data configuration in the learning table storage unit (part 1). The learning table storage unit stores the image identification information, the person region identification information, the coordinates 1, the coordinates 2, and the dividing ratio z in an associated manner. Such associated information forms one record in the learning table storage unit, and a plurality of records corresponding to a plurality of associated information items, if any, are stored in the learning table storage unit. The control unit 110 stores information indicating the position of the person region (the coordinates 1 and the coordinates 2) and the dividing ratio z for each person region in each image that is included in the video.

The image identification information is information for mutually identifying the plurality of images that are included in the video. The person region identification information is information for mutually identifying one or more person regions that are included in a single image. The coordinates 1 are upper left coordinates of the person region. The coordinates 2 are lower right coordinates of the person region. The values of the coordinates 1 and the coordinates 2 are represented by absolute coordinate values in the entire image by regarding the pixel at the upper left end of the image as an origin. The dividing ratio z is a ratio of the length up to the position $y_{max}$, at which the variation in luminance is the maximum, with respect to the entire corresponding person region.

Returning to FIG. 16, the control unit 110 calculates the dividing ratio z for each of all the images and then determines the dividing ratio z for each segment (Op. 25). For example, the control unit 110 specifies, from the learning table storage unit, all the records that include the lower right end (coordinates 2) of the person region in the ranges of the respective segments illustrated in FIGS. 11A and 11B. Then, the control unit 110 determines the dividing ratio z to be applied to the segment by calculating an average of the dividing ratios z that are stored in all the specified records.

Then, the control unit 110 generates dividing information that includes the segment identification information of the segment and the dividing ratio z (Op. 26). Then, the control unit 110 stores the dividing information in the dividing information storage unit 112 (Op. 27).

As described above, the dividing information is generated by using the video of the operator in the stage before the monitoring system is put into practice, for example. The search apparatus 100 may adaptively determine the dividing ratio z in accordance with the position of the person region at timing at which a person is searched for or at timing at which video is obtained from the camera and may divide the person region into at least two image regions at a position suitable for the searching for the person.

Method of Generating Dividing Information According to First Embodiment (Part 2)

A description will be given of a method of generating the dividing information (part 2). According to the method of generating the dividing information (part 2) in the first embodiment, the control unit 110 generates the dividing information by using video which is captured for a predetermined period of time after installation of the camera 200 is completed and including a captured image of a plurality of passers.

The method of generating the dividing information (part 2) is different from the method of generating the dividing information (part 1) only in that captured images of a plurality of persons are included in the video that is used for learning. Therefore, the video including captured images of persons in various clothes is obtained, and an average dividing ratio z in the respective segments is determined from the video (plurality of images).

First Modification Example of Method of Generating Dividing Information According to First Embodiment (Part 2)

Various modifications may be added to the method of generating the dividing information (part 2). First, a description will be given of Modification Example 1 in which reliability is used for determining the dividing ratio z for each segment. FIG. 18 is a processing flow of the method of generating the dividing information (part 2) according to Modification Example 1. The same reference numerals as those in FIG. 16 will be provided to the same processing as that in the method of generating the dividing information (part 1), and the descriptions thereof will be omitted.

After calculating the dividing ratio z for the image as the processing target, the control unit 110 calculates reliability R of the dividing ratio z (Op. 31). The reliability R is obtained by the following Equation 5 by using the amount of variation in F(y) at the position $y_{max}$ at which the variation in luminance is the maximum.

$$R = \frac{\left| \sum_{a=1}^{A} F(y_{max} - a) - \sum_{a=1}^{A} F(y_{max} + a) \right|}{V_{max}} \quad \text{(Equation 5)}$$

As represented by Equation 5, the reliability increases as luminance more greatly varies in the y direction in the vicinity of the position $y_{max}$. As a value of the reliability R increases, the reliability becomes higher. In addition, R is a value within a range from 0 to 1. $V_{max}$ is the maximum value of the amount of variation in luminance. In a case of a three-dimensional vector in which RGB range from 0 to 255, for example, $V_{max}$ is 255A·3(½) for the counting range A.

Figure 19A:
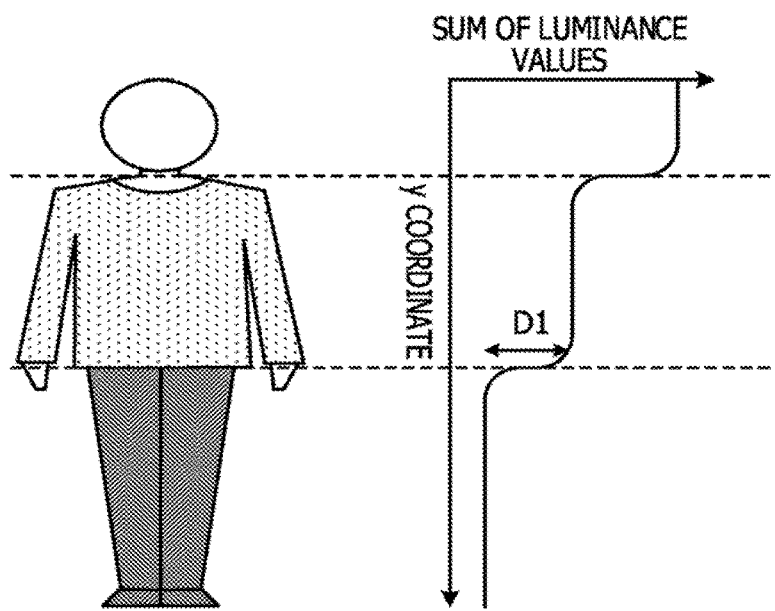
FIGS. 19A and 19B are diagrams for describing reliability.
Figure 19B:
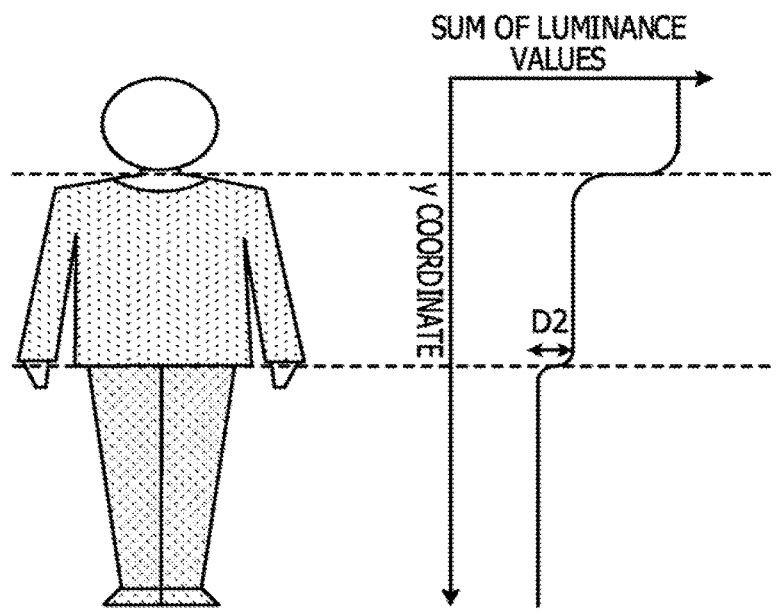

FIGS. 19A and 19B are diagrams for describing reliability. FIG. 19A illustrates a person region of a person in a white T-shirt and black pants and a variation in luminance in the y direction in the person region. In FIG. 19A, it is possible to understand that a large variation D1 in luminance occurs between an upper body and a lower body. In contrast, FIG. 19B illustrates a person region of a person in a white T shirt and beige pants and a variation D2 in luminance in the y direction in the person region. In such a case, the variation D2 in luminance that is caused between the white upper body and the beige lower body is smaller than the variation D1 in luminance in FIG. 19A.

In the case as illustrated in FIG. 19B, there is a possibility that the variation in luminance that is caused by a pattern or shading of the clothes becomes greater than the variation in luminance at the border between the upper body and the lower body. If the dividing ratio z is determined by using $y_{max}$ obtained in this case, there is a concern that precision of the final dividing ratio z for each segment deteriorates.

Thus, the control unit 110 provides lower reliability in the case as illustrated in FIG. 19B as compared with the case illustrated in FIG. 19k Therefore, it is possible to determine the dividing ratio z so as to more greatly reflect information with higher reliability by applying a weight depending on the reliability R when the dividing ratio z of each segment is determined.

FIG. 20 is an example of a data configuration in the learning table storage unit (part 2). According to Modification Example 1, the information of the reliability R is further associated and stored with the associated information in the learning table storage unit illustrated in FIG. 17.

Returning to FIG. 18, the control unit 110 determines the dividing ratio z of each segment (Op. 32). The control unit 110 determines the dividing ratio z of each segment by taking the reliability R into consideration.

Figure 21:
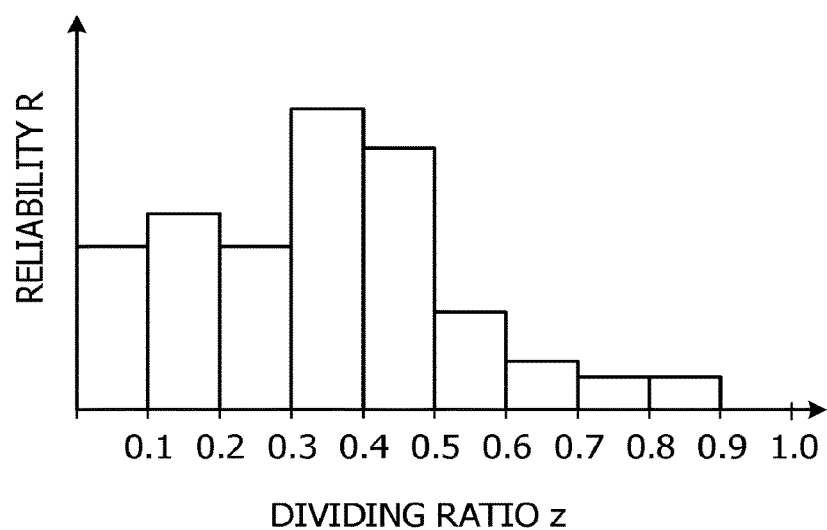
FIG. 21 is a histogram of a dividing ratio to which a weight is applied in accordance with reliability.

For example, the control unit 110 extracts a record corresponding to each segment from the learning table storage unit, multiplies the dividing ratio z of the extracted record by the reliability R, and then calculates an average value. The control unit 110 may measure frequency of the weighted dividing ratio z and generate a histogram as illustrated in FIG. 21. Then, the control unit 110 determines a dividing ratio z with the highest frequency as the dividing ratio z of the segment. FIG. 21 is a histogram of the dividing ratio that is weighted depending on the reliability. Typically, if one event that may be applied to the dividing ratio z is present, one vote is applied to a bin of the corresponding dividing ratio z in the histogram. In contrast, the number of votes (from 0 to 1 in practice) corresponding to the reliability R is provided to the bin of the dividing ratio z in this embodiment since weighted voting in accordance with the reliability R is performed.

Furthermore, the control unit 110 may use the reliability R as deviation and regard a ratio with the maximum votes as the dividing ratio z by performing distributed voting. For example, the control unit 110 performs distributed voting by using the following Equation 6 and then generates a histogram. Then, the control unit 110 determines the dividing ratio z with the maximum frequency in the histogram as the dividing ratio z of the corresponding segment.

$$f(r) = \frac{1}{\sqrt{2\pi\sigma^2}} \exp\left(-\frac{(r-\mu)^2}{2\sigma^2}\right) \quad \text{(Equation 6)}$$

$$\sigma = 1 - R \quad \text{(Equation 7)}$$

$$\sigma = \frac{1}{1+R} \quad \text{(Equation 8)}$$

$$\sigma = \exp(-R) \quad \text{(Equation 9)}$$

Here, r is a voting position in the histogram and is a value from 0 to 1. The width of the histogram is set to be an appropriate value such as 0.05 or 0.1. In addition, $\mu$ is a dividing ratio that is obtained from each person region. Furthermore, $\sigma$ is a value that indicates a degree of distribution of the voting and is obtained from Equations 7, 8, and 9, for example, by using the reliability R.

Second Modification Example of Method of Generating Dividing Information According to First Embodiment (Part 2)

Furthermore, the control unit 110 may employ the following Modification Example 2 for the method of generating the dividing information (part 2) and then generate the dividing information. The control unit 110 generates a plurality of dividing information items for seasons, time zones, or days, for example. In such a case, the control unit 110 adaptively switches dividing information to be referred to in accordance with a season, a time zone, and a day of the capturing of the image as a processing target (an image in video or a query image) when the control unit 110 executes various kinds of processing illustrated in FIGS. 8 and 14.

In addition, the control unit 110 may generate a plurality of dividing information items in accordance with heights of persons. In such a case, the control unit 110 extracts a record that includes a position (lower right coordinates) of a person region in a specific segment from the learning table storage unit. Then, the control unit 110 executes clustering of the height of the person for each segment in the extracted record. The height of the person region is a difference between the y coordinates of the coordinates 1 and the coordinates 2.

Then, the control unit 110 determines the dividing ratio z for each clustered group. It is possible to further enhance search precision by generating the dividing information depending on the height since there is a possibility that physical features vary depending on the height.

In addition, the information of each class, which is generated by the clustering, is separately stored in the dividing information storage unit 112. The control unit 110 specifies a class of each segment that includes the person region depending on the height of the person region and uses the dividing information corresponding to the class in the processing illustrated in FIGS. 8 and 14.

Second Embodiment

The search apparatus 100 according to the first embodiment determines the dividing ratio z by using the dividing information that is learned in advance. In contrast, a search apparatus 400 according to a second embodiment determines the dividing ratio z in consideration of how a person is viewed depending on a positional relationship between the person and the camera, by using an equation of using the height, the depression angle, and the like of the camera as parameters.

Figure 22:
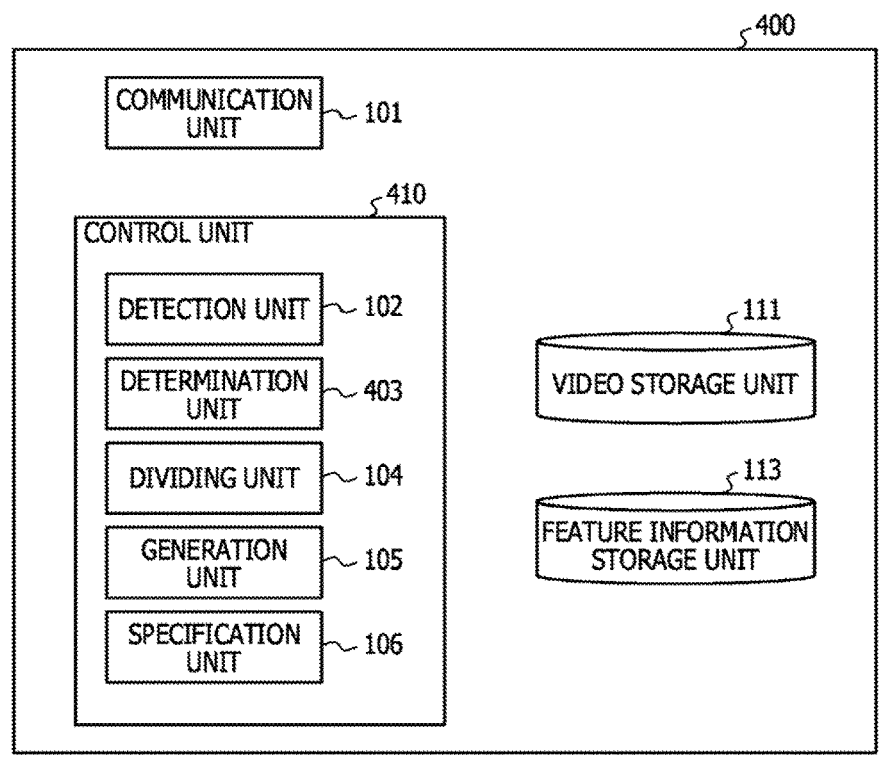
FIG. 22 is a functional block diagram of a search apparatus according to a second embodiment.

FIG. 22 is a functional block diagram of the search apparatus according to the second embodiment. The search apparatus 400 includes a communication unit 101, a control unit 410, a video storage unit 111, and a feature information storage unit 113. The same reference numerals will be given to processing units that perform the same processing as that of the search apparatus 100 according to the first embodiment, and the descriptions thereof will be omitted. Since the dividing information is not learned in advance in this embodiment, the dividing information storage unit 112 is not provided.

The control unit 410 includes a determination unit 403 that determines a dividing ratio by a different method from that in the first embodiment. The method of determining the dividing ratio by the determination unit 403 will be described below. More specifically, the determination unit 403 according to the embodiment adaptively determines a dividing position that reflects a dividing ratio in consideration of a positional relationship between the camera 200 and the object.

FIGS. 23A and 23B are diagrams for describing a method of determining a dividing position that reflects a dividing ratio according to the second embodiment. FIG. 23A is a diagram for describing camera installation conditions and a ground coordinate system. The camera 200 is installed at the height H from the ground at a depression angle θ. In addition, a focal length of the camera 200 is f.

The ground coordinate system is a three-dimensional space in which a Z axis is set in the depth direction (the horizontal direction of the paper), a Y axis is set in the vertical direction (the vertical direction of the paper), and an X axis is set in the horizontal direction (the depth direction of the paper) when viewed from the camera. Therefore, a person 500 is represented at a position P(X1, Y1, Z1) in the ground coordinate system. In addition, it is assumed that the position P is a position of feet of the person 500 and Y1 is 0.

Next, FIG. 23B illustrates the same image 6 as that in FIG. 10. However, the person region 60 corresponds to the person 500. In the same manner as in FIG. 10, the person region 60 is represented by the upper left coordinates P1($x1$, y1) and P2($x2$, y2).

A dividing ratio z' in the second embodiment is obtained by the following Equation 10 in the same manner as Equation 4. In addition, y1 and y2 are obtained by detecting the person region 60 in the image 6. In addition, $y_{div}$ is a dividing position (y coordinate) for dividing the person 500 in the ground coordinate system at a specific ratio (1−r:r) in consideration of the positional relationship between the camera 200 and the object. That is, if the person region 60 is divided at the position of $y_{div}$, the difference in the positional relationships between the camera 200 and the object (person 500) is absorbed, and the person region 60 is divided such that the person 500 is divided at the ratio of 1−r:r.

$$z' = \frac{y_{div} - y2}{y2 - y1} \quad \text{(Equation 10)}$$

Here, the height (yd) for division at the dividing ratio z is determined by Equation 1 by using the dividing ratio z that is determined in accordance with the position of the person region in the first embodiment. In contrast, the dividing position $y_{div}$ may be obtained directly in the second embodiment. Hereinafter, a description will be given of a method of obtaining $y_{div}$.

First, equations of conversion from coordinates (X, Y, Z) in the ground coordinate system to a projection position (x, y) on the image are represented as the following Equations 11 and 12.

$$x = f \frac{X}{Z\sin\theta - (Y - H)\cos\theta} \quad \text{(Equation 11)}$$

$$y = f \frac{Z\cos\theta - (Y - H)\sin\theta}{Z\sin\theta + (Y - H)\cos\theta} \quad \text{(Equation 12)}$$

Therefore, $y_{div}$ is represented by the following Equation 13 based on Equation 12. Here, the height h of the person 500 may be obtained by the following equation 14. In addition, r is appropriately set. In a case in which it is desirable to divide the person region 60 in the image in the same manner as the person 500 in the ground coordinate system being vertically divided at a ratio of 0.5:0.5, r is 0.5.

$$y_{div} = f \frac{Z1\cos\theta - ((1-r)h - H)\sin\theta}{Z1\sin\theta + ((1-r)h - H)\cos\theta} \quad \text{(Equation 13)}$$

$$h = H + H\frac{y\cos\theta + f\sin\theta}{-y_2\sin\theta + f\cos\theta} \cdot \frac{y_1\sin\theta - f\cos\theta}{y_1\cos\theta + f\sin\theta} \quad \text{(Equation 14)}$$

In the ground coordinate system in which the height (i coordinate) of the ground is 0, Y1 at the position P of the feet of the person 500 is 0. In addition, it is assumed that the position P of the person 500 in FIG. 23A corresponds to P2($x2$, y2) on the image 6 in FIG. 23B. In such a case, the following Equation 15 is obtained by assigning Y=Y1=0, y=y2, and Z=Z1 in Equation 12 and solving the equation for Z1.

$$Z1 = -H\frac{y_2\cos\theta + f\sin\theta}{-y_2\sin\theta + f\cos\theta} \quad \text{(Equation 15)}$$

The determination unit 403 may obtain the dividing position $y_{div}$ by assigning Equations 14 and 15 in Equation 13. The thus obtained $y_{div}$ makes it possible to divide the person region so as to divide the person in the ground coordinate system at the ratio of 1−r:r regardless of the positional relationship between the camera and the person.

Therefore, the search apparatus 400 according to the second embodiment may adaptively determine a dividing position that reflects the dividing ratio based on the position of the person region that is detected in the obtained image without learning the dividing ratio in advance, in response to an input of camera installation information (the depression angle and the height H).

Modification Example of Feature Information Registration Processing Performed on Feature Information Storage Unit Next, a description will be given of a modification example of the feature information registration processing. The following modification example may be applied to both the first embodiment and the second embodiment. In addition, the following modification example may be applied to a case in which the generated feature information is registered in the feature information storage unit in advance and a case in which a person as a search target is searched for in real time in the video received from the camera 200.

The search apparatus 100 and the search apparatus 400 according to the modification example (hereinafter, referred to as the search apparatus 100) associates person regions of persons, who are the same person with high possibility, in a plurality of images that are included in the video received from the camera 200 by using a known person tracking technique. For example, the search apparatus 100 performs tracking by an optical flow and association of the person regions in the plurality of images based on similarity of color histograms of the person regions in the respective images.

Then, the search apparatus 100 generates feature information that is used for matching with the feature information that is generated from the query image by using a color histogram when the person, which is the same person with high possibility, is present on the closer side to the camera 200. This is because an image of the person may be captured darkly as a whole if the distance between the camera 200 and the object (person) is equal to or greater than a predetermined distance, for example According to the modification example, it is possible to generate the feature information (color histogram) from an image in which colors and the like of the clothes of the person may be more easily recognized, in consideration of such a circumstance.

In addition, the search apparatus 100 may match average feature information obtained by averaging feature information that is generated from each person region of the person who is the same person with high possibility with the feature information that is generated from the query image. It is possible to generate more stable feature information by using the average feature information. According to the modification example, it is possible to stably recognize features of the person even if an image of the person at a location that illumination hardly reaches is captured, for example.

Other Modification Examples

The aforementioned embodiments were described as examples in which color information (color histogram) was used as feature information. However, the embodiments are not limited thereto, and different feature information may be used. For example, the search apparatus 100 and the search apparatus 400 may use edge information or texture information as feature information.

In addition, the search apparatus 100 and the search apparatus 400 may search for a person based on clothes and then search for the same person in the searched image by using features of a face. In doing so, it is possible to narrow down matching targets by the technique disclosed herein before searching for the same person.

Hardware Configuration

Figure 24:
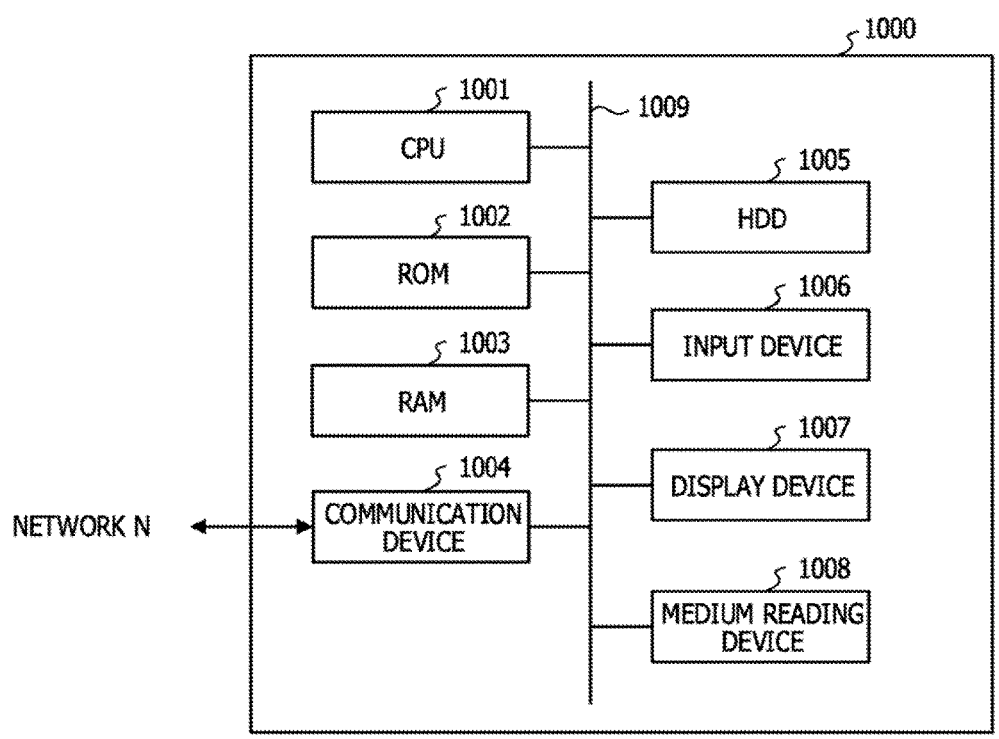
FIG. 24 is a hardware configuration example of a search apparatus according to an exemplary embodiment.

Next, FIG. 24 is an example of a hardware configuration of the search apparatus according to the exemplary embodiments. A computer 1000 executes the registration processing and the search processing according to the respective embodiments and functions as the search apparatus 100 or the search apparatus 400 (hereinafter, referred to as the search apparatus 100). The computer 1000 includes a central processing unit (CPU) 1001, a read only memory (ROM) 1002, a random access memory (RAM) 1003, a communication device 1004, a hard disk drive (HDD) 1005, an input device 1006, a display device 1007, and a medium reading device 1008, and the respective components are connected to each other via a bus 1009. In addition, the respective components may exchange data under control of the CPU 1001.

A program in which the registration processing, the search processing, the learning processing, and the like illustrated in the respective embodiments are described is recorded in a recording medium that may be read by the computer 1000. Examples of the recording medium that may be read by the computer 1000 include a magnetic recording device, an optical disc, a magnet-optical disk, and a semiconductor memory. Examples of the magnetic recording device include an HDD, a flexible disk (FD), and a magnetic tape (MD).

Examples of the optical disc include a digital versatile disc (DVD), a DVD-RAM, a compact disc-read only memory (CD-ROM), and a compact disc-recordable/rewritable (CD-R/RW). Examples of the magnet-optical recording medium include a magneto-optical disk (MO). In order to distribute the program in which the processing according to the respective embodiments is described, it is considered to sell portable recording media such as DVDs or CD-ROMs in which the program is recorded.

The medium reading device 1008, which executes the program according to the respective embodiments, in the computer 1000 reads the program from the recording medium that records the program. The CPU 1001 stores the read program in the HDD 1005, the ROM 1002, or the RAM 1003.

The CPU 1001 is a central processing unit that manages the overall operation control of the search apparatus 100. The CPU 1001 reads the program, in which the processing related to the respective embodiments is described, from the HDD 1005 and executes the program. The CPU 1001 functions as the control unit 110 (or the control unit 410) in the search apparatus 100. As described above, the program may be stored in the ROM 1002 or the RAM 1003 that may access the CPU 1001.

The communication device 1004 functions as the communication unit 101 under control of the CPU 1001.

The HDD 1005 stores various kinds of information and functions as the storage unit under control of the CPU 1001. The various kinds of information may be stored in the ROM 1002 or the RAM 1003 that may access the CPU 1001. Furthermore, various kinds of information that is temporarily generated and held in the course of the processing is stored in the RAM 1003, for example. That is, the RAM 1003 functions as the storage unit in some cases.

The input device 1006 receives various inputs. The input device 1006 is a keyboard or a mouse, for example. The display device 1007 displays various kinds of information. The display device 1007 is a display, for example.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A search system comprising:
circuitry configured to:
detect a first object from an image that is captured by an imaging device,
determine a dividing position in consideration of how the first object is viewed in the image, in accordance with a height at which the imaging device is installed, a depression angle of the imaging device, and a distance from the imaging device to the first object,
divide an image region corresponding to the first object into at least two image regions based on a dividing ratio that is obtained by correcting a predetermined ratio in accordance with the dividing position, and specify a second object in another image based on feature information of each of the at least two image regions, the second object corresponding to the first object in the image.

2. The search system according to claim 1, wherein the first object is designated based on information of a search target that is designated by a search request.

3. The search system according to claim 1, further comprising:
a memory configured to store each dividing ratio associated with information regarding how objects are viewed, and
wherein the dividing ratio is applied to the image region corresponding to the first object, in accordance with how the first object is viewed in the image.

4. The search system according to claim 3, wherein the circuitry is configured to:
detect an object region corresponding to the objects, from learning image information,
determine the dividing ratio for each detection position of the object region, and
store the dividing ratio in the memory in association with each detection position.

5. The search system according to claim 4, wherein the circuitry is configured to:
calculate a variation in luminance in the object region, and
determine the dividing ratio based on the variation in luminance.

6. The search system according to claim 1, wherein the first object and the second object are persons.

7. The search system according to claim 1, wherein the feature information is color information.

8. The search system according to claim 7, wherein the color information is a color histogram.

9. A search method comprising:
detecting a first object from an image that is captured by an imaging device;
determining, by circuitry, a dividing position in consideration of how the first object is viewed in the image, in accordance with a height at which the imaging device is installed, a depression angle of the imaging device, and a distance from the imaging device to the first object;
dividing an image region corresponding to the first object into at least two image regions based on a dividing ratio that is obtained by correcting a predetermined ratio in accordance with the dividing position; and
specifying a second object in another image based on feature information of each of the at least two image regions, the second object corresponding to the first object in the image.

10. The search method according to claim 9, wherein the first object is designated based on information of a search target that is designated by a search request.

11. The search method according to claim 9, further comprising:
generating each dividing ratio associated with information regarding how objects are viewed, and
wherein the dividing ratio is applied to the image region corresponding to the first object, in accordance with how the first object is viewed in the image.

12. The search method according to claim 11, further comprising:
detecting an object region corresponding to the objects, from learning image information;
determining the dividing ratio for each detection position of the object region; and
storing the dividing ratio into a memory in association with each detection position.

13. The search method according to claim 12, further comprising:
calculating a variation in luminance in the object region; and
determining the dividing ratio based on the variation in luminance.

14. The search method according to claim 9, wherein the first object and the second object are persons.

15. The search method according to claim 9, wherein the feature information is color information.

16. The search method according to claim 15, wherein the color information is a color histogram.

17. A non-transitory computer-readable storage medium storing a search program for causing a computer to execute a process, the process comprising:
detecting a first object from an image that is captured by an imaging device;
determining a dividing position in consideration of how the first object is viewed in the image, in accordance with a height at which the imaging device is installed, a depression angle of the imaging device, and a distance from the imaging device to the first object;
dividing an image region corresponding to the first object into at least two image regions based on a dividing ratio that is obtained by correcting a predetermined ratio in accordance with the dividing position; and
specifying a second object in another image based on feature information of each of the at least two image regions, the second object corresponding to the first object in the image.

* * * * *